(12) United States Patent
Gentilhomme

(10) Patent No.: US 10,948,616 B2
(45) Date of Patent: Mar. 16, 2021

(54) ADAPTIVE ENSEMBLE-BASED METHOD AND DEVICE FOR HIGHLY-NONLINEAR PROBLEMS

(71) Applicant: CGG SERVICES SAS, Massy (FR)

(72) Inventor: Theophile Gentilhomme, Renens (CH)

(73) Assignee: CGG SERVICES SAS, Massy (FR)

(*) Notice: Subject to any disclaimer, the term of this patent is extended or adjusted under 35 U.S.C. 154(b) by 356 days.

(21) Appl. No.: 15/353,887

(22) Filed: Nov. 17, 2016

(65) Prior Publication Data

US 2017/0139065 A1    May 18, 2017

Related U.S. Application Data

(60) Provisional application No. 62/256,796, filed on Nov. 18, 2015.

(51) Int. Cl.
  *G01V 1/28* (2006.01)
  *G01V 11/00* (2006.01)
  *G01V 99/00* (2009.01)

(52) U.S. Cl.
  CPC .............. *G01V 1/282* (2013.01); *G01V 11/00* (2013.01); *G01V 99/005* (2013.01); *G01V 2210/614* (2013.01)

(58) Field of Classification Search
  None
  See application file for complete search history.

(56) References Cited

U.S. PATENT DOCUMENTS

| 5,210,691 | A | * | 5/1993 | Freedman | ................ | G01V 3/28 |
| | | | | | | 324/339 |
| 5,583,825 | A | * | 12/1996 | Carrazzone | ............ | G01V 1/288 |
| | | | | | | 367/31 |

(Continued)

FOREIGN PATENT DOCUMENTS

| CA | 2439893 A1 * | 9/2002 | ............... G01V 3/28 |
| WO | 2011/037580 A1 | 3/2011 | |
| WO | 2012/024025 A1 | 2/2012 | |

OTHER PUBLICATIONS

Chen, Yan and Oliver, Dean S.—"Ensemble Randomized Maximum Likelihood Method as an Iterative Ensemble Smoother"; Math Geosci (2012) 44:1-26. (Year: 2012).*

(Continued)

*Primary Examiner* — Catherine T. Rastovski
*Assistant Examiner* — Leonard S Liang
(74) *Attorney, Agent, or Firm* — Patent Portfolio Builders PLLC

(57) ABSTRACT

Device, medium and method for generating an image of a subsurface of the earth. The method includes generating an ensemble of realizations (M) based on data related to the subsurface; applying an objective function (O) to members (m) of the ensemble of realizations (m) and corresponding estimated data to estimate a mismatch; selecting a best sensitivity matrix (G) from a plurality of sensitivity matrices associated with the objective function (O) and the ensemble of realizations (M); updating realization parameters ($m_{pr}$), which are used as input for a forward model (f), to calculate the corresponding estimated data, based on the best sensitivity matrix (G); and generating an image of the subsurface based on (1) the data related to the subsurface of the earth and (2) the forward model (f) with updated realization parameters ($m_{pr}$).

20 Claims, 11 Drawing Sheets

(56) References Cited

U.S. PATENT DOCUMENTS

| | | | | |
|---|---|---|---|---|
| 5,870,690 | A * | 2/1999 | Frenkel | G01V 1/48 702/7 |
| 5,889,729 | A * | 3/1999 | Frenkel | G01V 3/20 367/73 |
| 5,995,906 | A * | 11/1999 | Doyen | G01V 11/00 702/16 |
| 6,005,916 | A * | 12/1999 | Johnson | A61B 5/05 378/87 |
| 6,278,948 | B1 * | 8/2001 | Jorgensen | G01V 1/30 702/14 |
| 6,324,478 | B1 * | 11/2001 | Popovici | G01V 1/305 702/18 |
| 6,424,918 | B1 * | 7/2002 | Jorgensen | G01V 1/30 702/14 |
| 6,502,037 | B1 * | 12/2002 | Jorgensen | G01V 11/00 702/14 |
| 7,366,616 | B2 * | 4/2008 | Bennett | E21B 49/00 702/7 |
| 7,373,252 | B2 * | 5/2008 | Sherrill | G01V 1/30 702/17 |
| 7,627,428 | B2 * | 12/2009 | Pan | G01N 3/20 702/14 |
| 8,589,078 | B2 * | 11/2013 | Djikpesse | G01V 99/00 702/11 |
| 9,069,100 | B2 * | 6/2015 | Kolbjornsen | G01V 11/00 |
| 9,176,930 | B2 * | 11/2015 | Lee | G06F 17/16 |
| 9,223,042 | B2 * | 12/2015 | Maucec | G01V 1/30 |
| 9,348,059 | B2 * | 5/2016 | Enstedt | G01V 99/005 |
| 9,939,549 | B2 * | 4/2018 | Miles | G01V 5/00 |
| 10,379,247 | B2 * | 8/2019 | Kitazawa | G01V 1/303 |
| 10,422,899 | B2 * | 9/2019 | Bansal | G01V 1/005 |
| 2003/0060981 | A1 * | 3/2003 | Routh | G01V 1/30 702/14 |
| 2004/0019427 | A1 | 1/2004 | San Martin et al. | |
| 2004/0196738 | A1 * | 10/2004 | Tal-Ezer | G01V 1/28 367/51 |
| 2006/0055403 | A1 * | 3/2006 | Freedman | G01V 11/00 324/303 |
| 2008/0195358 | A1 * | 8/2008 | El Ouair | G01V 1/30 703/2 |
| 2009/0005993 | A1 * | 1/2009 | Abubakar | G01V 11/00 702/7 |
| 2009/0083006 | A1 * | 3/2009 | MacKie | G01V 11/00 703/1 |
| 2009/0157320 | A1 * | 6/2009 | Abubakar | G01V 3/38 702/11 |
| 2009/0204327 | A1 * | 8/2009 | Lu | G01V 3/12 702/7 |
| 2009/0303834 | A1 * | 12/2009 | Sengupta | G01V 1/303 367/73 |
| 2010/0018719 | A1 * | 1/2010 | Lu | G01V 3/12 166/369 |
| 2010/0185422 | A1 * | 7/2010 | Hoversten | G01V 11/00 703/2 |
| 2010/0286967 | A1 * | 11/2010 | Vasilevskiy | G01V 7/00 703/2 |
| 2011/0022319 | A1 * | 1/2011 | Djikpesse | G01V 11/00 702/11 |
| 2011/0222370 | A1 * | 9/2011 | Downton | G01V 1/24 367/73 |
| 2011/0307438 | A1 * | 12/2011 | Fernandez Martinez | G06N 7/005 706/52 |
| 2011/0313737 | A1 * | 12/2011 | Hadj-Sassi | G01V 99/005 703/2 |
| 2012/0080197 | A1 * | 4/2012 | Dickens | G01V 3/083 166/369 |
| 2012/0232865 | A1 * | 9/2012 | Maucec | G06F 17/18 703/2 |
| 2012/0316791 | A1 * | 12/2012 | Shah | G01V 1/282 702/14 |
| 2013/0138408 | A1 * | 5/2013 | Lee | G01V 1/282 703/2 |
| 2014/0112099 | A1 * | 4/2014 | Hofland | G01V 1/362 367/73 |
| 2014/0214324 | A1 * | 7/2014 | Freedman | G01V 5/08 702/8 |
| 2014/0320126 | A1 * | 10/2014 | Heaton | G01V 3/32 324/303 |
| 2015/0100241 | A1 * | 4/2015 | Theune | G01V 99/005 702/14 |
| 2015/0260872 | A1 * | 9/2015 | Hou | G01V 11/00 702/7 |
| 2015/0362623 | A1 * | 12/2015 | Miotti | G01V 11/00 702/14 |
| 2016/0070023 | A1 * | 3/2016 | Herrmann | G06F 17/13 702/14 |
| 2016/0097870 | A1 * | 4/2016 | Routh | G01V 1/003 703/2 |
| 2016/0109593 | A1 * | 4/2016 | Saxena | G01V 1/306 702/16 |
| 2016/0154129 | A1 * | 6/2016 | Sayers | G01V 1/306 702/13 |
| 2017/0075030 | A1 * | 3/2017 | Wheelock | G01V 99/005 |
| 2017/0108618 | A1 * | 4/2017 | Bjornemo | G06F 30/00 |
| 2017/0115411 | A1 * | 4/2017 | Zhang | G01V 1/282 |
| 2017/0115422 | A1 * | 4/2017 | Kitazawa | G01V 1/303 |
| 2017/0160425 | A1 * | 6/2017 | Miles | G01V 5/00 |
| 2017/0371072 | A1 * | 12/2017 | Shetty | G01V 99/005 |
| 2018/0059281 | A1 * | 3/2018 | Arro | G01V 3/32 |
| 2018/0180754 | A1 * | 6/2018 | Pires de Vasconcelos | G01V 1/28 |
| 2018/0347353 | A1 * | 12/2018 | Wang | G01V 3/28 |
| 2018/0372896 | A1 * | 12/2018 | Johansen | G06N 7/005 |
| 2019/0011583 | A1 * | 1/2019 | Ray | G01V 1/303 |
| 2019/0017370 | A1 * | 1/2019 | Wilson | G01V 3/34 |
| 2019/0057168 | A1 * | 2/2019 | Holland | G01V 99/005 |
| 2019/0302296 | A1 * | 10/2019 | Aharchaou | G01V 1/362 |

OTHER PUBLICATIONS

S. Boyd, "Convex Optimization", Cambridge University Press, 2004.

A. Buland et al., "Bayesian Linearized AVO Inversion", Geophysics, Jan.-Feb. 2003, vol. 68, No. 1, pp. 185-198.

T. Coléou et al., "Unsupervised Seismic Facies Classification: A Review and Comparison of Techniques and Implementation", The Leading Edge, Oct. 2003, ppp. 942-953.

G. Evensen, "The Ensemble Kalman Filerter: Theoretical Formulation and Practical Implementation", Ocean Dynamics, 2003, vol. 53, pp. 343-367.

T. Gentilhomme et al., "Smooth Multi-scale Parameterization for Integration of Seismic and Production Data using Second-generation Wavelets", ECMOR XII—13th European Conference on the Mathematics of Oil Recovery, Biarritz, France, Sep. 10-13, 2012.

G. Golub et al., "Matrix Computations", Third Edition, 1996, The Johns Hopkins University Press.

M.A. Iglesias et al., "The Regularizing Levenberg-Marquardt Scheme for History Matching of Petroleum Reservoirs", Comput Geosci, 2013, pp. 1033-1053.

R. Moyen et al., "Reservoir Connectivity Uncertainty from Stochastic Seismic Inversion", SEG International Exposition and Annual Meeting, Houston, Texas, 2009, pp. 2378-2382.

Extended European Search Report in corresponding European Application No. EP 16 30 6483 dated Apr. 3, 2017.

T. Gentilhomme, et al.; "Adaptive multi-scale ensemble-based history matching of seismic-derived models" 13th International Congress of the Brazilian Geophysical Society; Aug. 26, 2013; pp. 1-6; Rio de Janeiro, Brazil.

T. Gentilhomme; "Integration multi-echelles des donnees de reservoir et quantification des incertitudes"; [Retrieved from the Internet on Mar. 23, 2017, chapters 1 and 4: URL:http://docnum.univ-lorraine.fr/public/DDOC_T_2014_0089_GENTILHOMME.pdf]; pp. 1-212.

(56) References Cited

OTHER PUBLICATIONS

D. Oliver, et al.; "Inverse theory for Petroleum Reservoir Characterization and History Matching"; XP055358130; Jan. 1, 2008; pp. 1-394; Cambridge, MA.

\* cited by examiner

ADAPTIVE ENSEMBLE-BASED METHOD AND DEVICE FOR HIGHLY-NONLINEAR PROBLEMS

CROSS REFERENCE TO RELATED APPLICATIONS

The present application claims the benefit of priority under 35 U.S.C. § 119(e) to U.S. Provisional Application No. 62/256,796 filed on Nov. 18, 2015, the entire contents of which is hereby incorporated by reference.

BACKGROUND

Technical Field

Embodiments of the subject matter disclosed herein generally relate to methods and systems for characterizing a subsurface and, more particularly, to mechanisms and techniques for processing data related to the subsurface based on an adaptive ensemble-based approach.

Discussion of the Background

A forward model (e.g., reservoir simulation, geo-mechanical model) is a tool that gives an estimated response of a simulated process (e.g., numerical simulation of physical phenomena, such as fluid mechanics, geophysics) insight into dynamic rock and fluid properties for evaluation of past reservoir performance, prediction of future reservoir performance, and reserve estimation. Reservoir simulation might be the only reliable method to predict performance of large complex reservoirs. Additionally, simulation results, when combined with 3-D time-lapse seismic results, form a reservoir-monitoring tool for mapping changes associated with production that can be used to understand past reservoir behavior for future prediction.

Very often, the parameters of the forward model are calculated using an inverse problem, i.e., the process of determining the parameters of the model by minimizing an objective function that measures the misfit between the observed data and the simulation (predicted or calculated data) given by the forward model. However, an inverse problem can be a highly non-linear (i.e., it has multiple local minima, discontinuities in the objective function) and have multiple possible solutions (i.e. states for which the objective function has equivalent low values that fell under the uncertainties of the data). Global or local optimization methods can generally be used to try to solve those problems.

The global optimization methods aim at finding a global minimum. These methods include stochastic methods (e.g., simulated annealing, Monte Carlo methods) that can provide uncertainty quantification, and (meta) heuristic methods (e.g., particle swarms, genetic or evolutionary algorithms) [Liberti and Maculan (2006)]. These methods are generally robust, but they can only invert a limited number of parameters and a large number of iterations is required in order for the methods to converge. This makes the use of these methods difficult for large problems and/or when the forward model is computationally expensive. Moreover, it is not straightforward to express their mathematical formulations, thus making the analysis more difficult. Global methods based on stochastic perturbations generally do not preserve the prior models (when prior models are required) and if no constraints are used to regularize the process, the outputs can be noisy.

Sampling methods based on random paths of Markov chains, called Monte-Carlo-Markov-Chains (MCMC) are considered to be the only methods capable of correctly sampling the uncertainty space (sampling the P-PDF (posterior probability density function). However, a large number of chains and samples are required to obtain a valid approximation of the P-PDF. When the number of evaluations of the forward models is limited, sampling methods based on optimization might be more effective.

The RML method (Randomized Maximum likelihood) [Oliver et al. (2008), Oliver, Reynolds, and Liu] is based on the deterministic optimizations of samples generated from the prior PDF constrained by data vector sampled from the data distribution (assuming the observed data are uncertain and that an uncertainty model is available). One major drawback of this method is that one optimization needs to be run per sample, which limits the number of posterior samples to be generated. However, a better estimation of the posterior PDF can be obtained with the RML method than with the MCMC for a limited number of samples as the RML samples will be less correlated than the samples belonging to the same Markov chain [Oliver et al. (2008), Oliver, Reynolds, and Liu].

The local methods are looking for a minimum around a starting state. At each iteration, these methods model the shape of the objective function and update the models accordingly, so that the forward response of the new model moves closer to the observed data. The local methods are generally divided into two main groups: gradient (true or approximate) based methods, such as conjugate gradient, quadratic approximations (Sequential Quadratic Programing or SQP), Newtons methods, or BFGS methods [Boyd and Vandenberghe (2004), Oliver et al. (2008), Oliver, Reynolds, and Liu], and the gradient free methods, such as the direct search methods [Powell (1994)].

Gauss-Newton (GN) methods generally have a fast convergence, which limits the number of forward model calls and improve the computational efficiency of the resolution. GN methods locally approximate the objective function by using its gradient (first derivative) and Hessian (second derivative). There are three main limitations of these methods: (1) the gradient and Hessian can be difficult to obtain as they usually involve forward model derivatives. (2) For a nonlinear problem, the GN methods are used assuming that the objective function is convex, which is generally incorrect. In this case, the optimization process converges to a local minimum and cannot find a valid solution of the problem. (3) GN methods are deterministic so that only one solution is obtained without uncertainty quantification.

Ensemble-based methods [Oliver et al. (2008), Oliver, Reynolds, and Liu, Evensen (2003)] following a Gauss-Newton approach are able to partially resolve these problems. The gradient and Hessian of the objective function are statistically estimated from an ensemble of realizations. In this way, the equations of the forward model do not have to be known and the derivatives do not have to explicitly be computed, which is a major advantage when the foundations (e.g., mathematics and implementation) of the forward model are not known. Because the gradient is estimated globally, it can help avoid local minima in highly nonlinear cases (but the convergence toward a global minimum is not guaranteed). However, as the size of the ensemble is usually limited, the estimation can be poor and thus, close to the minimum, the convergence will not be as good as the analytical case when true derivatives are used. Finally, ensemble based methods are simultaneously updating all the realizations using the global gradient and the final ensemble provides an estimation of the uncertainties. However, because only one linearization is used to update all the realizations of the ensemble, the final variability can be quite small and usually only one minimum can be sampled, which leads to an underestimation of the uncertainties.

Thus, there is a need to develop a method capable of overcoming the above noted problems of the existing non-linear inversion methods, while using the mentioned advantages (i.e., fast convergences, unknown forward model, and uncertainty quantification).

SUMMARY OF THE INVENTION

According to an embodiment, there is a method for generating an image of a subsurface of the earth. The method includes a step of generating an ensemble of realizations (M) based on data related to the subsurface; a step of applying an objective function (O) to members (m) of the ensemble of realizations (m) and corresponding estimated data to estimate a mismatch; a step of selecting a best sensitivity matrix (G) from a plurality of sensitivity matrices associated with the objective function (O) and the ensemble of realizations (M); a step of updating realization parameters ($m_{pr}$), which are used as input for a forward model (f), to calculate the corresponding estimated data, based on the best sensitivity matrix (G); and a step of generating an image of the subsurface based on (1) the data related to the subsurface of the earth and (2) the forward model (f) with updated realization parameters ($m_{pr}$).

According to another embodiment, there is a computing device for generating an image of a subsurface of the earth. The computing device includes an interface configured to receive data related to the subsurface; and a processor connected to the interface. The processor is configured to generate an ensemble of realizations (M) based on data related to the subsurface, apply an objective function (O) to members (m) of the ensemble of realizations (m) and corresponding estimated data to estimate a mismatch, select a best sensitivity matrix (G) from a plurality of sensitivity matrices associated with the objective function (O) and the ensemble of realizations (M), update realization parameters (mpr), which are used as input for a forward model (f), to calculate the corresponding estimated data, based on the best sensitivity matrix (G), and generate an image of the subsurface based on (1) the data related to the subsurface of the earth and (2) the forward model (f) with updated realization parameters (mpr).

According to still another exemplary embodiment, there is a non-transitory computer-readable medium including computer-executable instructions, wherein the instructions, when executed by a processor, implement instructions for generating an image of a subsurface of the earth. The instructions implement the method steps discussed above.

Note that some ill-posed problems facing the seismic processing community have not been able to be solved with the existing algorithms due to the multitude of local minima, as discussed next. However, the methods noted above, which are discussed in more detail next, when implemented in a processor appropriate for handling seismic data, were capable to solve these problems.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to seismic data. However, the embodiments to be discussed next are not limited to this kind of data, but they may applied to other kind of data.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, it is proposed an adaptive ensemble-based optimization method (AEOM) that follows a Gauss-Newton approach. The method, as discussed later in more detail, updates the parameters of a model using a quadratic approximation of an objective function. The AEOM uses an ensemble-based approach in which a sensitivity matrix or first order linearization of the forward model is statistically computed, from the ensemble, and all the realizations are updated simultaneously. A realization is the output of a model that is construed to characterize a given volume V of the subsurface, or parameters associated with a forward model, which may be included from the beginning of the inversion process.

Figure 1A:
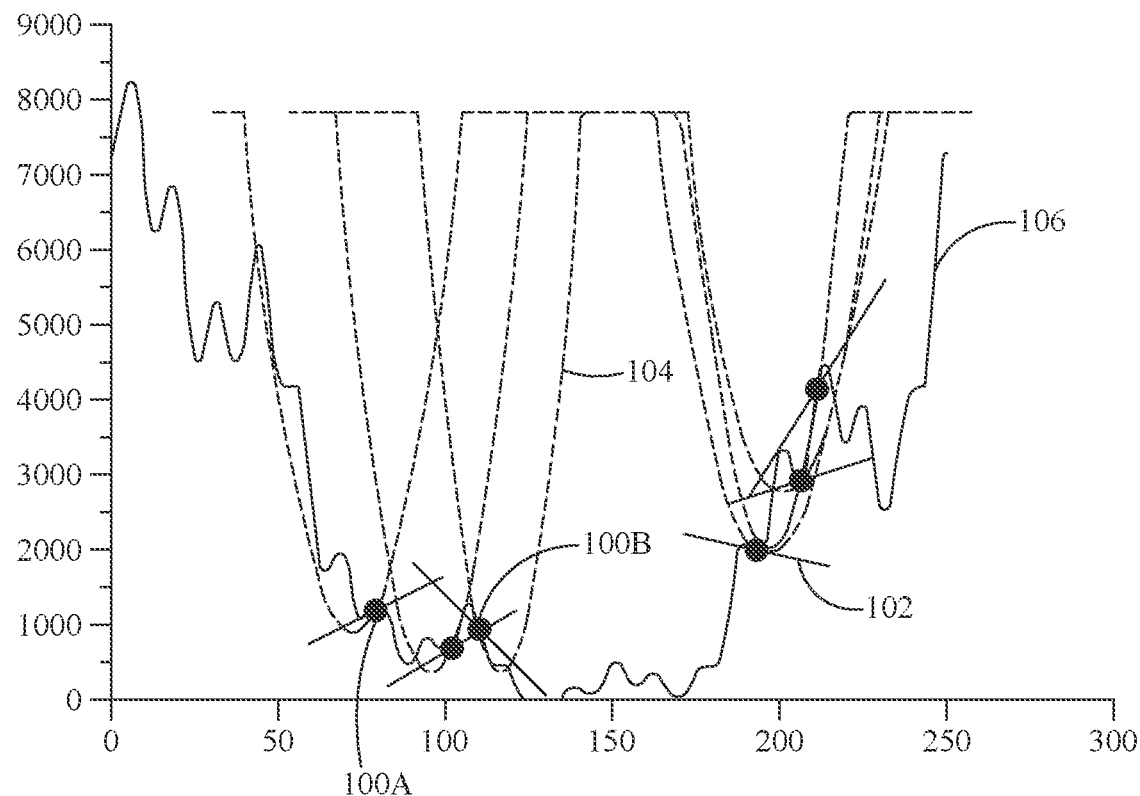
FIGS. 1A (initial state) and 1B (final state) illustrate gradient-based methods converging toward a local minimum when the problem is non-convex; note that independent updates are applied for each sample in this case.
Figure 1B:
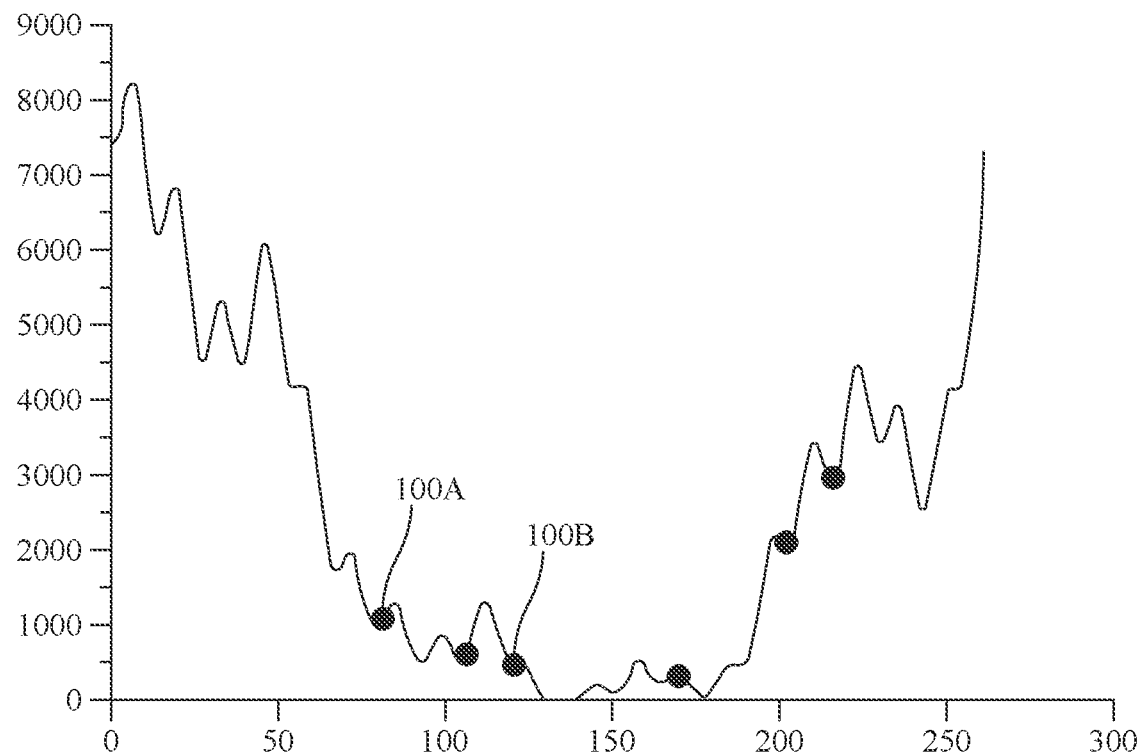

The drawback of the Gauss-Newton methods, and more generally gradient-based methods, is that they can converge toward a local minimum when the problem is non-convex, as illustrated in FIGS. 1A and 1B. FIG. 1A shows the minima 100A, B, etc. before a Gauss-Newton update (zero iterations), for several states using true local derivatives for a 1D problem. Lines 102 represent the local gradients while curves 104 represent the local quadratic approximation of the Gauss-Newton update. Line 106 represents the objective function. FIG. 1B shows the local minima 100A and 100B after a Gauss-Newton update (three iterations). In this case, the models are stuck in local minima.

Figure 2A:
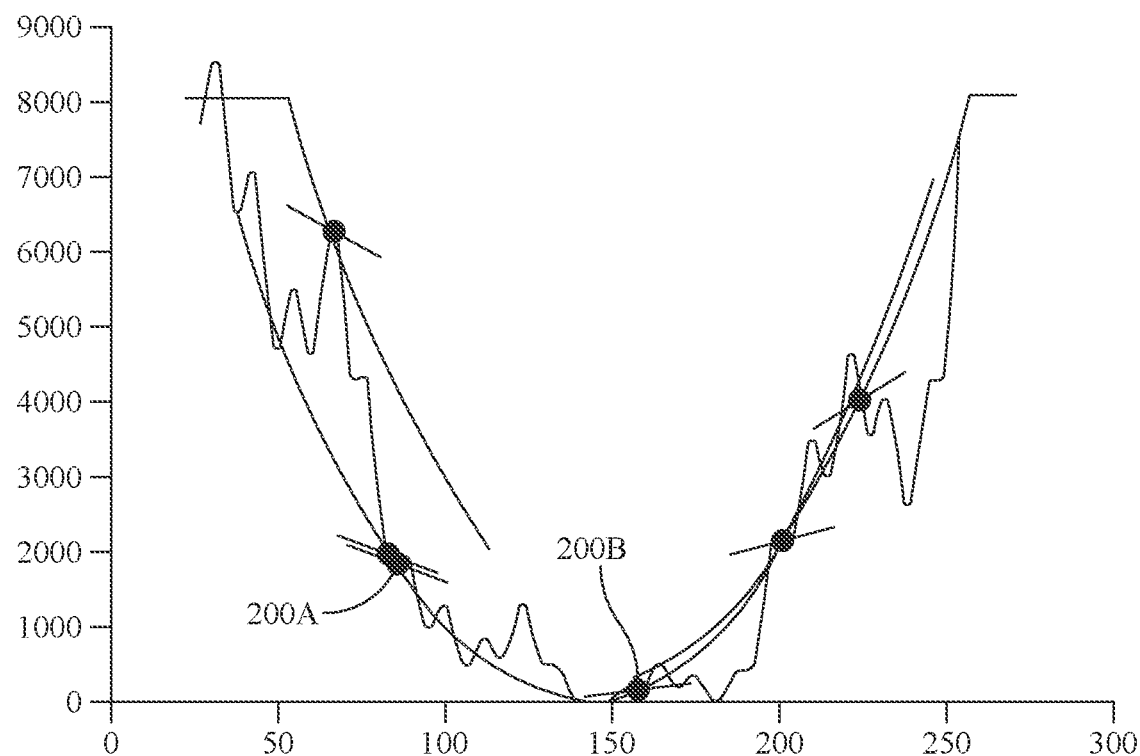
FIGS. 2A (initial state) and 2B (final state) illustrate ensemble-based methods using a global approximation to converge toward a better solution and avoid local minima; however, the figures show on underestimation of the uncertainties due to a small spread of the final sample.
Figure 2B:
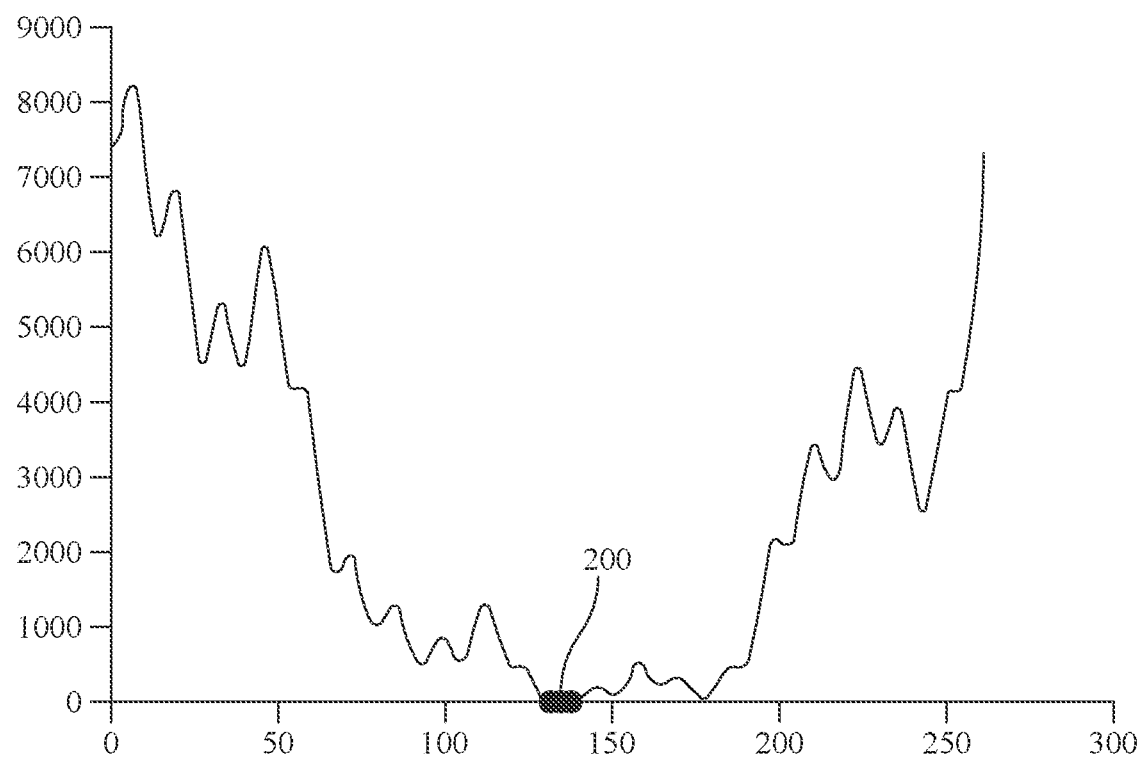

When an ensemble-based approximation is used, the global approximation may help the problem to converge toward a better solution (e.g., better match of the data) and avoid local minima, as illustrated in FIGS. 2A and 2B. FIG. 2A shows a global approximation before update (still having plural minima 200A, 200B, etc.) while FIG. 2B shows the global approximation after the update (three iterations). A better convergence is obtained in this case, but the uncertainties are poorly estimated as all the different models converge toward the same minimum 200.

The global approximation is only effective when the problem is approximately convex (i.e., first order convex, but can have high frequency local minima as in FIG. 2B) and the models only converge around one solution, which implies a poor estimation of the uncertainties in case several minima with about the same level of misfit exists.

Figure 3A:
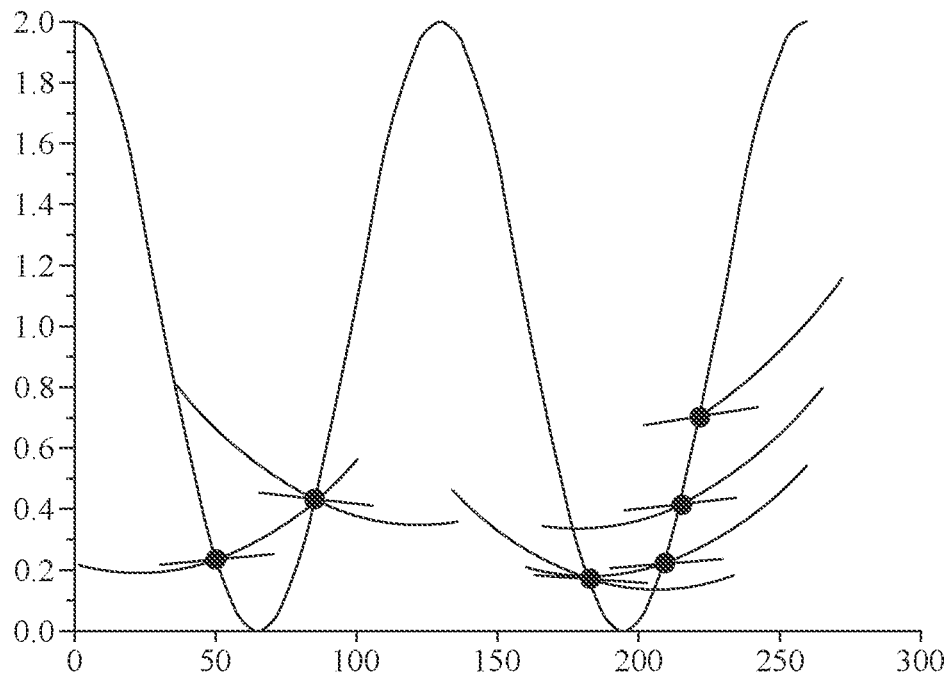
FIGS. 3A (initial state) and 3B (final state) illustrate that the traditional ensemble-based methods fail to converge to a global minimum for a given ill-posed problems with too many synthetic global minima.
Figure 3B:
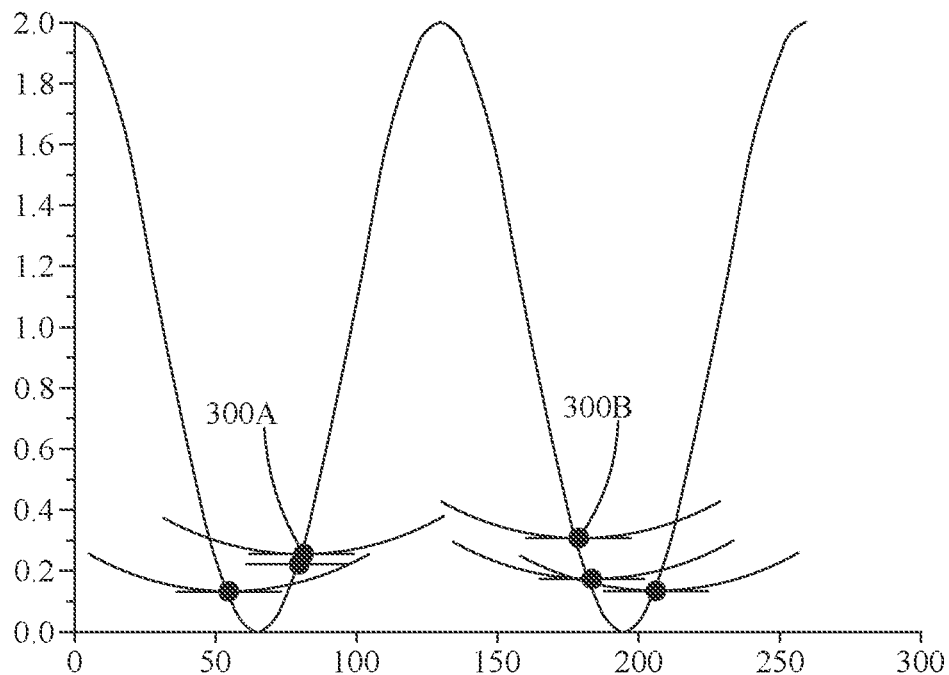

For problems presenting very different (distinct) solutions, the global approximation may fail as illustrated in FIGS. 3A and 3B, as multiple minima 300A and 300B are still present after two iterations in FIG. 3B as the approximation of the objective function is incorrect and the optimization of the samples is stuck in this stage (approximated global gradient is flat).

Figure 4:
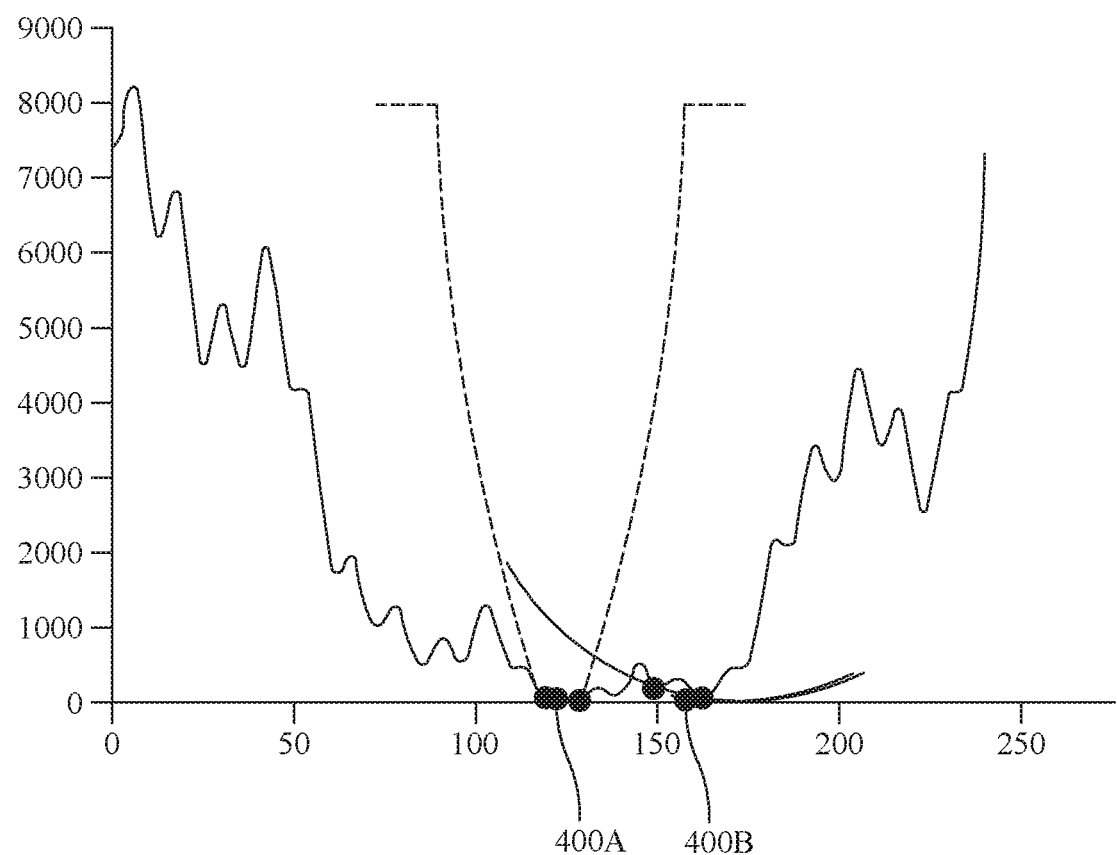
FIG. 4 illustrates how a novel adaptive ensemble-based optimization method arrives to global distinct minima and better sample the uncertainties (larger spread) for ill-posed problems.

According to an embodiment, the AEOM generates several approximations of the objective function at multiple scales using different subsets of samples and chooses the most adapted approximation to update the models. As illustrated in FIG. 4, the AEOM method uses global, local and intermediate approximations, depending on the current state of the model. The method converges to different equivalent minima (or solutions) 400A and 400B. It is also possible to test different approximations until the objective function is improved. Various aspects of this method are now discussed in more detail and a mathematical justification for this method is presented.

The following notations are used for the mathematical description of the AEOM method for the example of petrophysical inversion conditioned by seismic derived data:

| Element notation | Type of the element | Description |
|---|---|---|
| $n^d$ | Scalar | Number of conditioned data |
| $d_e$ | Vector of $n^d$ elements | Elastic properties used to condition the inversion |
| n | Scalar | Number of parameters to be inverted |
| m | Vector of n elements | Realization of parameters to be inverted (e.g., porosity, shale volume) |
| M | Matrix | Ensemble of realizations matrix having on each column one realization m |
| $m_{pr}$ | Vector of n elements | A priori realization parameters to be inverted (e.g., porosity, shale volume) |
| $n^f$ | Scalar | Number of control parameters of the PEM forward model that are not inverted |
| p | Vector of $n^f$ elements | Control parameter of the PEM (not inverted) |
| k | Scalar | Current trace (or gridblock) visited by the SNLO |
| $m_k$ | Vector of $n^P \times (k-1)$ elements | Parameters previously simulated by the SNLO algorithm |
| $n^P$ | Scalar | Number of inverted properties (e.g., (poro, NTG) == $n^P = 2$) |
| $m_{sk}$ | Vector of $n^P$ elements | Estimated value by Kriging at gridblock k |
| $f_{pem}(m, p)$ | Function | Forward model (PEM). Transforms a given set of parameters (m, p) to elastic properties $d_{sim}$. This function is assumed non-linear but continuous. |
| F | ($n^d \times n$) Matrix | Jacobian matrix of the forward model. Matrix of partial derivative of the forward model $f_{pem}(m, p)$ response to the model parameters m for a current state. |
| $d_{sim}$ | Vector of $n^d$ elements | Simulated response, such that $d_{sim} = f(m, p)$ |
| $C_D$ | ($n^d \times n^d$) matrix. | Error matrix of the conditioning data. Note that the data are often normalized and the matrix assumed diagonal such that $C_D = I$ |
| $C_m$ | (n × n) matrix. | Covariance matrix of the inverted parameters m |
| $C_{sk}$ | matrix | Local kriging covariance matrix |
| α | Vector | Local kriging weights |
| $C_p$ | ($n^P \times n^P$) matrix | Covariance matrix of the control parameter p of the PEM |
| $n^s$ | Scalar | Number of seismic conditioning data |
| s | Vector of $n^s$ elements | Seismic data |

| Element notation | Type of the element | Description |
|---|---|---|
| $f_s()$ | Function (forward seismic model) | Non-linear forward seismic model, such that, $s = f_s(d_e)$, for any elastic parameters $d_e$ |
| $G_s$ | $(n^s \times n^d)$ matrix | Linearization of the seismic forward model such that, $s \approx G_s d_e$. |
| $f(m, p)$ | Function (forward seismic + PEM model) | Non-linear forward model including a PEM and a seismic forward modeling, such that, $s = f(m, p)$, for any petrophysical parameters m, with $f(m, p) = f_s \circ f_{pem}(m) \approx G_s \cdot f_{pem}(m)$ |
| $G$ | $(n^s \times n)$ matrix | Linearization of the full forward model such that, $s = G_s F d_e$. |
| $n^r$ | Scalar | Number of realizations |
| $n^e$ | Scalar | Number of sample used to estimate F |
| $n^c$ | Scalar | Number of gridblocks in a given trace |

The following definitions are used throughout this document:

Observed data: observed data or data represents the recorded observations of a physical phenomenon induced by the perturbation of a system. For example, the recorded time travel of a seismic wave through the earth (in this case the system) is data that carries information about the rock velocity.

Parameter and model: parameter refers to a quantity that influences the output or behavior of the forward model. A model is an ensemble of parameters that represents a system. For example, values of rock velocity at different locations can be a model of the earth when studying seismic wave propagations.

Spatial property: spatial property or property represents a set of parameters associated with a spatial location for a given rock characteristic. For example, rock properties, such as rock velocity or porosity, are spatial properties.

Forward model: a forward model or forward modeling is a process that simulates a response (e.g., physical phenomena) from a model. For example, the process of simulating the propagation of seismic waves through a given earth model is a forward model.

Inverse problem: the inverse problem is the process of determining the parameters of a model by minimizing an objective function that measures the misfit between the observed data and simulated data estimated/predicted/calculated by the forward model.

Optimization: optimization is the mathematical process of minimizing an objective function by modifying the model parameters.

Ill-posed problem: ill-posed means a problem that does not have one unique solution; it can have several equivalent solutions (i.e., different models can reproduce the same set of observed data) or no solution. The described method is most useful in the context of ill-posed problems with multiple solutions. However, the method can also be used to solve a problem with a unique solution.

Sampling: sampling is the process of calculating several possible solutions of an ill-posed problem. The final set of sample provides an estimation of the uncertainties associated with the ill posed problem.

The Inverse Problem
Prior Model

According to an embodiment, the prior PDF is assumed to be Gaussian, but the described method remains valid for other distributions, and is given by:

$$P(m) \propto \exp^{[-1/2(m-m_{av})^T C_m^{-1}(m-m_{av})]}, \quad (1)$$

where $m_{av}$ is the prior mean vector of the multivariate Gaussian distribution. The covariance matrix $C_m$ can either be given by some variograms or approximated by an ensemble of realizations (or both, e.g., regularization of the ensemble based covariance matrix). As discussed later, it is assumed that an ensemble of $n^r$ prior realizations sampled from (or representative of) the prior distribution are available.

Data Likelihood

In the following, a forward model $f(m,p)=f_s \cdot f_{pem}(m)$ (any other forward model may be considered) is considered to be composed of one (petro-elastic model) PEM and one seismic forward model $f_s$. Although the seismic forward model $f_s$ can be analytically linearized (e.g., Fatti approximation), the general case in which $f_s()$ is nonlinear is considered herein. Here m is the realization of the parameters $m_{pr}$ to be inverted and p is a control parameter of the PEM model. Realization m is one possible realization in an ensemble of realizations (M). An inverted parameter is an input that controls a response of the forward model and the inverted parameter(s) is modified during an inversion process.

The data used in the inversion process (i.e., example of application) can be either a (processed) seismic signal s or a set of seismic derived attributes $d_e$ (note that this optimization process can be used with any kind of data). In the second case, the method aims at matching the seismic response $f_s(d_e)$ of the elastic set rather than the vector of elastic parameters itself. Indeed, the direct use of $d_e$ would penalize the simulation of frequencies that are not present in $d_e$ (as $d_e$ is itself derived from a band-limited seismic signal). However, if the elastic data vector already incorporates fine scale variations (e.g., realizations coming from the Bayesian seismic inversion), it is possible to remove the forward seismic model $f_s()$ from the forward model $f(m, p)$, which makes the method more efficient in this particular context. This point is discussed later.

In this embodiment, the general case in which the available data are the seismic or elastic parameters coming from any inversion process is considered. The conditioned data used during the petro-physical inversion is denoted by s, where s can be either seismic data or the seismic response $s=f_s(d_e)$ of a seismic derived elastic model.

The observed data being in general noisy or derived from an ill-posed inversion constrained by noisy seismic data, and the forward model $f(m, p)$ being uncertain (e.g., empirical relationship based on noisy data, the conceptual model is valid only for non-realistic conditions), the relation between the reference parameters m and the data s is given by:

$$s = f(m,p) + \varepsilon, \quad (2)$$

where ε describes the observation and modeling errors (noise), sampled from the Guassian distribution:

$$\varepsilon \sim N(0, C_D), \quad (3)$$

where the covariance matrix $C_D$ is assumed to be diagonal uncorrelated noise.

Thus, the likelihood of the simulated response s given by the parameters m can be modeled as:

$$p(s|m) = p(\varepsilon = f(m,p) - s) \propto \exp[-\frac{1}{2}(f(m,p)-s)^T C_D^{-1}(f(m,p)-s)], \quad (4)$$

where T is the transpose operator.

Posterior Distribution

Using equations (4) and (1) and applying the Bayes theorem, the posterior distribution (up to a normalization constant) is obtained as follows:

$$p(m|d_e) \propto p(s|m) p(m)$$

$$\propto \exp[-\frac{1}{2}(f(m,p)-s)^T C_D^{-1}(f(m,p)-s) - \frac{1}{2}(m-m_{av})^T C_m^{-1}(m-m_{av})]$$

$$\propto \exp[-\frac{1}{2}O(m)], \quad (5)$$

with $$O(m) = \frac{1}{2}(f(m,p)-s)^T C_D^{-1}(f(m,p)-s) + \frac{1}{2}(m-m_{av})^T C_m^{-1}(m-m_{av}). \quad (6)$$

Objective Function

The forward model f(m, p) being generally nonlinear, it is not possible to compute analytically the distribution of equation (6). Two approaches can then be followed: (1) Obtain the maximum a posteriori (MAP) of the distribution or (2) Sample the distribution in order to quantify the uncertainties.

Maximum a Posteriori (MAP)

The estimation of the MAP requires only one minimization of equation (6). However, the output of MAP will be vertically at the seismic resolution and not at a resolution of the flow reservoir model.

Sampling Based on Optimization

In order to estimate the posterior distribution given by equation (5), this embodiment uses the Randomized Maximum Likelihood (RML) algorithm [Oliver et al. (2008), Oliver, Reynolds, and Liu]. The principle of the method is to generate one unconditional realization (not conditioned by the data used in the inversion, but it can be conditioned by other data or a priori knowledge) and correct it using the data s. Assuming that the prior model and the data model are Gaussian, the RML is defined by the following steps:
1. Generate (or select) a realization of model parameter $m_i \sim N(m_{av}, C_m)$;
2. Generate (or select) a data realization coming from the seismic distribution $s_i \sim N(s, C_D)$, or derived from an elastic distribution (e.g., realization coming from Bayesian inversion [Buland and Orme (2003)]), $s^i = f_s(d^i_e)$, with $d^i_e \sim N(d_e, C_D^e)$;
3. Minimize the objective function of equation (7), $$O_i(m) = \frac{1}{2}(f(m,p)-s^i)^T C_D^{-1}(f(m,p)-s^i) + \frac{1}{2}(m-m_{av})^T C_m^{-1}(m-m_{av}). \quad (7)$$

The process is repeated as many times as possible. The final ensemble of realizations gives an approximation of the P-PDF. When the forward model f(m, p) is linear, the RML algorithm perfectly sampled the P-PDF [Oliver et al. (2008), Oliver, Reynolds]. When f(m, p) is non-linear, the RML gives a good approximation of the P-PDF.

The generated realizations will be vertically defined at the reservoir scale. The RML algorithm requires one minimization process per realization, which can be computationally demanding, but it is possible to improve the performance when several realizations are simultaneously generated, as will be discussed later.

Decomposition of the Objective Function: Sequential Non-Linear Optimization (SNLO)

This section is mostly valid when the forward model can be independently applied on subparts of the inverted model. When the forward model f(m, p) can be independently applied from trace-to-trace (or gridblock-to-gridblock, where a cell or gridblock are considered herein to be interchangeable, and they refer to a finest element of a discretized domain), as it is the case for petro-elastic models, the first term of equation (7) can be split into independent terms for each trace (or gridblock) of the model. Note that when f(m, p) = $f_{pem}$(m, p), the first term of the equation (7) can be split into independent terms for each gridblock of the model as $f_{pem}$(m, p) is independently applied for each gridblock of the model. However, the second term of the equation (the prior and spatial correlation constraint) involves all the parameters of the model. When the problem is large (e.g., seismic models), the computation of the second term can be difficult.

In this embodiment, it is proposed to follow a sequential approach in order to decompose the objective function to be optimized into several dependent objective functions of smaller dimension (see, for example, Moyen, R., & Doyen, P. M., Reservoir connectivity uncertainty from stochastic seismic inversion, SEG Annual Meeting. Society of Exploration Geophysicists, 2009). The sequential approach follows the principle of Sequential Simulation methods: it is assumed that each set of parameters (e.g., porosity, VClay, cement) $m_k$ of the trace k can be inverted only constrained by the elements $m_b$, b={0, 1, . . . , k-1} previously simulated in the traces {0, 1, . . . , k-1}. Thus, it is possible to decompose the minimization problem of equation (7) into semi-independent problems given by (omitting the subscript i which identifies the realization):

$$O(m_k) = \frac{1}{2}(f(m_k,p)-s(k))^T C_D^{-1}(f(m_k,p)-s(k)) + \frac{1}{2}(m_k-m_{sk})^T C_{sk}^{-1}(m_k-m_{sk}), \quad (8)$$

where $m_{sk}$ and $C_{sk}$ correspond to the prior kriged values and kriging covariance at trace k given by:

$$m_{sk} = m_{pr,k} + a \times \alpha^T (m_b - m_{pr,\{0, \ldots, k-1\}}) \quad (9)$$

$$C_{sk} = C_{m\ kk} - C_{m\ bk}^T \alpha, \quad (10)$$

where $C_{m\ kk}$ and $C_{m\ bk}$ are the prior covariance matrix between the elements simulated at the gridblock k and the prior covariance matrix between the elements previously simulated and the elements currently simulated, and a belongs to interval [0, 1] and it is a scalar which weights the continuity constraint. The vector α is composed of the Kriging weights given by:

$$C_{m\ bb} \alpha = C_{m\ bk}, \quad (11)$$

where $C_{m\ bb}$ is the prior covariance matrix between all the elements in the k-1 previously simulated gridblocks.

All the prior covariance matrices can be either estimated using an ensemble of realizations or a variogram model.

Adaptive Prior Constraint

In some cases, highly sensitive parameters (selected, for example, by the operator of the computing device running the inversion process) can be inverted along with other less sensitive parameters. This may lead to an "over-tuning" of the sensitive parameters and an incorrect estimation of their values. In petro-elastic inversion, gas saturation is usually a very sensitive parameter and the presence (or absence) of the gas has a strong impact on the elastic response of the rock. The inversion of gas saturation along with other parameters, such as porosity, can lead to noisy models where small quantities of gas are added or removed everywhere in the reservoir to reproduce the observed elastic response.

In order to prevent these effects, in one embodiment, adaptive constraints are applied to the sensitive parameters. Bonding values are defined for these parameters so that the algorithm penalizes fast deviations from these bonding values. However, when the current values of the inverted parameters are far from the bonding values, no or little constraint is applied. For example, in petro-elastic inversion, it is possible to use a "0 bonding value" for the gas saturation so that addition of gas in an initial state without gas is penalized (but not impossible). The algorithm will then try to find a solution without gas (e.g., by increasing the porosity). If the presence of the gas is mandatory to reproduce the observed data, the algorithm is still able to add a small amount of gas and the constraint will be softened at the next iteration (as it is dependent on the current saturation of gas).

A constrained prior standard deviation $\sigma_p^c$ of parameter p of value v associated with a bonding value b can be defined as:

$$\sigma_p^c(v) = \frac{\sigma_p}{1 + \frac{1}{(v-b)^{2n} + \varepsilon}}, \quad (12)$$

where $\sigma_p$ is the prior standard deviation of p, n>0 is the constraint exponent that defines the range of the adaptive constraint and $\varepsilon$ is a small value that avoids zero division and controls the minimum constraint value. When the value v is far from b, the standard deviation is almost equal to the prior standard deviation as the term $$\frac{1}{(v-b)^{2n} + \varepsilon}$$

is almost zero. However, when the value of v is closer to b, the standard deviation used as prior constraint is quickly decreasing so that the perturbation of the parameter value is limited during the optimization. To still be able to modify this parameter, $\varepsilon>0$ is given. When $\varepsilon$ is large, the adaptive constraint is softened so that more important changes can be made to the parameter value v even when v is close to b. Parameter $\varepsilon$ can evolve with the iterations and the mismatch. For example, at the first iterations, $\varepsilon$ can be very small making the adaptive constraint predominant while in the next iterations, $\varepsilon$ can be increased, especially when an important mismatch is still observed, so that the adaptive constraint is softened. The value of the exponent n depends on the sensitivity of the response to the parameter p around b. For example, if a small change of p has a big impact on the forward response, n should take large values.

Additional Constraints

In some cases, the forward model f(m, p) is unstable for some configurations of parameters or the inversion process leads to unphysical values. It is then possible to truncate the values of the parameters (e.g., set the negative porosity to zero), but this could affect the convergence of the optimization and might produce artefacts. Instead, according to this embodiment, it is proposed to constrain the minimization process by adding inequality terms as follows:

min($O(m_k)$) subject to $g_i(m_k) \geq 0, h_i(m_k) \geq 0$, with $i \in [1, n^c \times n^p]$ (13)

and $g_i(m_k) = P_i(m_k - p^{min})$ $h_i(m_k) = P_i(p^{max} - p_k)$, (14)

where $p^{min}$ and $p^{max}$ are the minimum and maximum vectors of values of the properties (e.g., porosity, VClay) for the elements of the trace of if gridblocks, and $P_i$ is a diagonal projection matrix that returns a vector with only zero values except at the position i.

Method of Optimization

To solve equation (13), this embodiment uses quadratic approximations of the objective function and the constraints at the position $m^l$ for a perturbation $\delta m$:

$O(m) \approx Q(\delta m) = O(m^l) + \nabla O(m^l)^T \delta m + \frac{1}{2} \delta m^T H_l \delta m$ min $Q(\delta m)$ is subject to $g_i(m^l) + \nabla g_i(m^l) \delta m = P_i(m^l - p^{min} - \delta m) \leq 0$ $h_i(m^l) + \nabla h_i(m^l) \delta m = P_i(p^{max} - m_l + \delta m) \leq 0$, (15)

where $\nabla O(m^l)^T$ and $H_l = \nabla_m[(\nabla O(m^l))^T]$ represent the gradient and Hessian of the objective function at iteration I. When the Hessian is a positive definite matrix, $Q(\delta m)$ is minimum (unique) when its derivative is nil. Thus, the perturbation required to minimize $Q(\delta m)$ is given by:

$H_l \delta m^l = -\nabla O(m^l)$ (16)

and the local minimum of the quadratic approximation is given by:

$m^{l+1} = m^l + \delta m^l$, (17)

where $\delta m^l$ is the solution of equation (16).

If the solution of equation (17) does not satisfy the constraints $g_j$ (where j belongs to $I_g$) and/or $h_j$ (where j belongs to $I_h$), where $I_g$ and $I_h$ are the indexes of the constraints $g_i$ and $h_i$ that are not respected, the update is rejected and the method solves the unconstrained Lagrange problem instead, which is given by:

$$\min O(m^l) + \nabla O(m^l)^T \delta m + \frac{1}{2} \delta m^T H_l \delta m - \mu_g^T P_g(m^l - p^{min} - \delta m) - \mu_h^T P_h(p^{max} - m_l + \delta m), \quad (18)$$

where $$P_g = \sum_{j \in I_g} P_j \quad (19)$$

$$P_h = \sum_{j \in I_h} P_j. \quad (20)$$

The solution of equation (18) has all its derivatives equal to zero, so that the following equations need to be solved:

$\nabla O(m^l) + H_l \delta m + P_g \mu_g - P_h \mu_h = 0$ (21)

$P_g(m^l - p^{min} - \delta m) = 0$ (22)

$P_h(p^{max} - m_l + \delta m) = 0$ (23)

or in the matrix form:

$$\begin{bmatrix} H_l & -P_g^T & -P_h^T \\ P_g & 0 & 0 \\ P_h & 0 & 0 \end{bmatrix} \cdot \begin{bmatrix} \delta m \\ \mu_g \\ \mu_h \end{bmatrix} = \begin{bmatrix} \nabla O(m^l) \\ P_g(m^l - p^{min}) \\ P_h(p^{max} - m_l) \end{bmatrix}. \quad (24)$$

Note that the elements $\mu_i$ corresponding to the respective constraints are equal to zero and do not need to be computed (reduce the size of the system).

Example of Constraints on the Saturation

In transition zones, where the fluid saturation is uncertain, it can be useful to apply some constraints to the fluid transitions. In this embodiment, it is proposed to develop the example of a water/oil system. In the transition zone, it is desired that the oil saturation (and inversely, the water saturation) globally increases with depth, such that:

$$P_z m - P_{z+1} m + c_f \varepsilon \leq 0 \quad (25)$$

where $P_z m$ is the projection m on the axis of oil saturation, $P_{z+1}m$ is the projection of m on the axis of oil saturation with an upward shift of one gridblock, for example:

$$P_{z+1} = \begin{bmatrix} 0 & 1 & 0 \\ 0 & 0 & 1 \\ 0 & 0 & 0 \end{bmatrix} \quad (26)$$

$$m = \begin{bmatrix} a \\ b \\ c \end{bmatrix} \quad (27)$$

$$P_{z+1}m = \begin{bmatrix} 0 & 1 & 0 \\ 0 & 0 & 1 \\ 0 & 0 & 0 \end{bmatrix} \begin{bmatrix} a \\ b \\ c \end{bmatrix} = \begin{bmatrix} b \\ c \\ 0 \end{bmatrix} \quad (28)$$

and $c_f \varepsilon$ represents the tolerance on the constraint, which can evolve with the iteration I. The first order constraint at iteration I is then given by:

$$P_z m^l - P_{z+1} m^l + c_f \varepsilon + (P_z + P_{z+1}) \delta m \leq 0. \quad (29)$$

Note that when each gridblock is inverted independently (with continuity constraint), the constraint for the gridblock $m_z$ at depth z is given by:

$$P_z m^l - P_{z+1} m^l_{z+1} + c_f \varepsilon + P_z \delta m \leq 0. \quad (30)$$

as $P_{z+1} m^l_{z+1}$ is independent of $m_z$.

Levenberg-Marquardt Control of the Iterations

When the initial guess is far from the solution and the problem is nonlinear, the quadratic approximation of the objective function is only valid locally. Thus, the update of the parameters must be controlled. In this embodiment, it is proposed to use the Levenberg-Marquadt method (trust-region algorithm), which is based on the modification of the shape of the Hessian in order to limit the updates into a given trust region as described by:

$$(\lambda C_m^{-1} + H_l)\delta m^l = -\nabla O(m^l), \quad (31)$$

where $\lambda$ is the Levenberg-Marquadt damping parameter. The value of $\lambda$ controls both the step size and the direction of the update. When $\lambda$ is large, the effect of the Hessian becomes negligible, i.e., $(\lambda C_m^{-1} + H_l) \approx \lambda C_m^{-1}$ and only the gradient controls the values of update of the parameters. The effect of the Hessian becomes larger when $\lambda$ decreases.

The control of $\lambda$ depends on the value of the objective function (i.e., the distance to the optimum). Far from the minimum (beginning of the optimization), the value of the objective function is high and the quadratic approximation is not valid. As a consequence, the value of $\lambda$ is large. However, close to the minimum, the Gauss-Newton update is valid and therefore, the value of $\lambda$ is small. In this embodiment, the value of $\lambda$ is initialized and controlled based on an initial value of the objective function and its evolution.

Development of the Equations

In order to simply the calculations associated with the above equations, it is assumed in this embodiment that $C_m = C_{sk}$ and $m_b = m_{sk}$. Then, all the elements of the system described by equation (31) are expressed analytically using the objective function (8). The gradient and Hessian of the objective function are given by:

$$\nabla O(m) = C_m^{-1}(m - m_{pr}) + G^T C_D^{-1}(f(m,p) - s) \quad (32)$$

and $$H = C_m^{-1} + G^T C_D^{-1} G + (\nabla G)^T C_D^{-1}(f(m,p) - s), \quad (33)$$

where G is a ($n \times n^d$) matrix of partial derivatives of the forward model f(m, p) for the parameters m, such that each element $g_{ij} = G(i, j)$ is given by:

$$g_{ij} = \frac{\partial f_i(m)}{\partial m_j}. \quad (34)$$

This matrix is called sensitivity matrix and it estimates the influence of the variations of the parameters on the simulated response (linearization of the forward model).

The gradient of the sensitivity matrix being very difficult to obtain, the third term of the equation (33) is neglected in the Gauss-Newton method and the Hessian is given by:

$$H = C_m^{-1} + G^T C_D^{-1} G. \quad (35)$$

Thus, the Hessian is obtained as soon as the sensitivity matrix G is known (or estimated).

By substituting equations (35) and (32) in equation (31), the Levenberg-Marquardt update, $\delta m_l$, is obtained as follows:

$$\delta m^l = -((\lambda+1)C_m^{-1} + G^T C_D^{-1} G)^{-1}[C_m^{-1}(m - m_{pr}) + G^T C_D^{-1}(f(m,p) - s)]. \quad (36)$$

When the number of data is smaller than the number of parameters (i.e., $n_d \ll n$), the following form is preferred:

$$\delta m^l = -\frac{(m^l - m_{pr})}{\lambda + 1} - C_m G_l^T \left( ((\lambda+1)C_D + G_l C_m G_l^T)^{-1} \left( f(m,p) - s - \frac{G_l(m^l - m_{pr})}{\lambda + 1} \right) \right). \quad (37)$$

Honor Well Data

The embodiments discussed herein assume that the prior petro-physical realizations are honoring the well data (data collected with receivers located in a well). Thus, to ensure that the hard data remain honored after the optimization, low values of uncertainty are set for the gridblocks that are intersected by the well paths.

Adaptive Method and Practical Implementations

Sensitivity Matrix

This embodiment discusses various ingredients that will be used by the AEOM method for highly-nonlinear problems that is discussed later with regard to FIG. 5. The sensitivity matrix is approximated using an ensemble method. Thus, the proposed inversion method is completely independent of the forward model (i.e., PEM+seismic simulation can be used as a black box).

In this embodiment, a linearized version of the forward seismic model is used, i.e., $s=G_s d_e$. Then $f(m, p)=G_s f_{pem}(m, p)$ and only the partial derivatives related to the PEM need to be computed. Thus, $G=G_s F$, where F is the local linearization of the PEM (i.e., sensitivity matrix of the PEM).

The PEM being applied independently in each gridblock of a given trace, the sensitivity matrix F can be written as:

$$F = \begin{bmatrix} F^{1,1} & 0 & 0 & 0 \\ 0 & F^{2,2} & 0 & 0 \\ \vdots & \ldots & \ddots & \vdots \\ 0 & 0 & 0 & F^{n^c,n^c} \end{bmatrix} \quad (38)$$

where $n^c$ is the number of gridblocks in the trace and $F^{c,c}$ is a ($n^d \times n^p$) sensitivity matrix relating the elastic data and the petro-physical parameters in the gridblock c of the current trace.

Then, each matrix $F^{c,c}$ is estimated using the relation:

$$\Delta D_{c,c} = F^{c,c} \Delta M^{c,c} \quad (39)$$

or $$F^{c,c} \approx \Delta D_{c,c} \Delta M^{c,c+} \quad (40)$$

so that, $$F = \begin{bmatrix} \Delta D^{1,1} & 0 & 0 & 0 \\ 0 & \Delta D^{2,2} & 0 & 0 \\ \vdots & \ldots & \ddots & \vdots \\ 0 & 0 & 0 & \Delta D^{n^c,n^c} \end{bmatrix} \begin{bmatrix} \Delta M^{1,1} & 0 & 0 & 0 \\ 0 & \Delta M^{2,2} & 0 & 0 \\ \vdots & \ldots & \ddots & \vdots \\ 0 & 0 & 0 & \Delta M^{n^c,n^c} \end{bmatrix}^+, \quad (41)$$

where $x^+$ represents the pseudo-inverse of the matrix x, $\Delta D$ is a matrix that contains in each column one member of an ensemble of prediction, $d_e = f_{pem}(m, p)$, from which the mean of all the predictions is subtracted, and $\Delta M$ is a matrix that contains in each column one member of an ensemble of vectors of parameters, m, from which it is subtracted the mean of all the realizations mi. Because the forward model $f_{pem}(m, p)$ is applied independently in each gridblock of the model, the matrices $\Delta D^{i,i}$ and $\Delta M^{i,i}$ can be constructed using different responses in different gridblocks and different realizations.

In this embodiment, the method selects an ensemble of realizations adapted to the current state of parameters $m(c)^I$ at the iteration I in gridblock c. As explained before, the quadratic approximation is a local approximation. Therefore, to get an accurate local linearization at point $m(c)^I$, the statistical estimation of the sensitivity matrix $F^{c,c}$ should be based on a pool of samples located around the point $m(c)^I$ (but the best local approximation does not necessary means the best choice, as discussed in the next section).

To efficiently get the neighbors of $m(c)^I$, the method first has to define a one $n^p$-D index for each property vector m(c) of each gridblock c. Then, each $F^{c,c}$ are computed using the direct neighborhood. Note that the discretization of the $n^p$-D space does not have to be extremely fine: one index can correspond to an ensemble of vector m(c).

Because $n^p$ is generally small (from 2 to 7), the computation of the $F^{c,c}$ is fast. When the size of the ensemble is larger than the number of parameters, which makes the estimation of $F^{i,i}$ reliable, equation (40) can be more efficiently solved in the following form (known as ordinary least square):

$$F^{c,c} \approx \Delta D^{c,c} \Delta M^{c,cT} \Delta M^{c,c} \Delta M^{c,cT} + \varepsilon I^{-1} \quad (42)$$

where $\Delta M^{c,cT} \Delta M^{c,c} + \varepsilon I^{-1}$ is an invertible matrix and $\varepsilon$ is a very small scalar that ensures the non-singularity of the matrix when the samples of the ensemble are collapsed.

When the forward seismic model $f_s( )$ cannot be linearized, $G_s$ has to be estimated. This can also be achieved using the ensemble-based estimation method described by equation (40). Because $G_s$ is applied to the entire trace, the adaptive selection of the neighborhood described above is less efficient and the size of the ensemble will probably be limited, which would produce a less accurate estimation of $G_s$. However, assuming that the linearization is valid for all the traces and iterations, $G_s$ only has to be estimated once using all the traces of the model. When the inverse problem is constrained by elastic attributes (no convolution involved), the linearization of the forward model is achieved independently in each traces, making the process much more efficient.

Quadratic Approximation: Global Versus Local

It is generally thought that the best convergence and minimization is obtained with the best estimation of the local derivatives (e.g., gradient, Hessian). If this can be true for a purely convex problem, it is generally not correct when the problem becomes non-convex, like the example presented in FIGS. 1A and 1B. In the 1D example of FIGS. 1A and 1B, the forward model $f(x)=x+6 \cos(0.5x)+3 \log(x)\sin(0.1x)+10 \cos^2(0.1x)$ was used and the conditioned data d=140, such that the quadratic objective function is given by $OF(x)=(f(x)-d)^2$ when the error in the data is normalized and no prior regularization term is used. The local gradient for each sample is given by: $f'(x)f(x)$ with $f'(x)=1-3 \sin(0.5x)+0.3 \log(x)\cos(x)+(3/x)\sin(0.1x)-2 \sin(0.1x)\cos(0.1x)$.

As shown in FIGS. 2A and 2B, the use of a local analytically computed quadratic approximations leads to local minima. The first strength of ensemble methods is the use of a global statistical quadratic approximation based on all the realizations that are sampling the objective function. Thus, as presented in FIGS. 1A and 1B, the quadratic approximation avoids high frequency local minima. Moreover, the quality of the approximation is improved when the number of samples is large, which is typically the case in the petro-elastic inversion problem discussed in one of the previous embodiments (the problem being gridblock-by-gridblock independent, many samples are available).

However, if a global gradient helps avoid local minima, it provides a poor local approximation of the objective function, which can affect the convergence of the optimization (the local shape of the objective function close to the minimum being poorly modeled).

The second strength (which can also be a weakness as discussed later) of ensemble-based method is its ability to adapt the quadratic approximation using the updated ensemble. When the global quadratic approximation is correct, all the members of the ensemble will be updated toward the same point, which reduces the variability, but provides a better local approximation at the next iteration. Thus, the algorithm will converge locally.

However, if the first global quadratic approximation(s) is (are) poor, the reduction of variability of the ensemble can occur far from the global minimum and similarly to the analytical case, the algorithm will converge to a local minimum. A second drawback of the use of a global gradient is the situation where several equally good minima exist in the objective function, as illustrated in FIGS. 3A and 3B. In this case, two problematic situations can arise: (1) The initial sampling will favor one minimum and the uncertainties will not be correctly represented (incorrect sampling of the posterior, see FIG. 2A to 3B), and (2) the average global gradient will not be valid (not consistent) for each individual realizations and will produce incorrect updates, which will affect the convergence (see FIGS. 3A and 3B).

In the petro-physical inversion discussed in this embodiment, it is possible to have a very large number of samples compared to the dimension of the problem. For this reason, one embodiment provides $n^{ap}$ quadratic approximations using different ensembles, and selects the one which is more adapted to the local state of a particular realization m.

For each quadratic approximation, the method of this embodiment selects $n^s \gg n^p$ neighbor samples, homogeneously distributed around the current bin of the $n^p$-dimensional grid that stores all the configurations contained by the different grids. The number of bins in one direction of the $n^p$-dimensional grid is denoted by $n^b$ and it is assumed (just in this embodiment to simplify the description) that the $n^p$-dimensional grid is isotropic (same dimensions in all the directions). The maximum separating distance used to select the $n^s$ neighbor samples of the ensemble is assumed to be $I_i \in [1, n^b/2]$ with $i \in [1, n^{ap}]$, and this distance is used to compute the sensitivity matrix F(i). Then, the method computes the associated gradient of the data mismatch for the current trace, such that, $$\nabla O(m) = F^T G_s^T (f(m,p) - d_{sim}) = F^T y_s, \quad (43)$$

(assuming the data have been normalized, i.e., $C_D^{-1} = I$), where $y_s = G_s^T (f(m, p) - s)$. Using the fact that F is a block diagonal (see equation (38)) with submatrices $F^{c,c}$, the gradient given by the equation (43) can be written as:

$$\nabla O(m) = \begin{bmatrix} F^{1,1} y_s[0:n^p[ \\ F^{2,2} y_s[n^p:2n^p[ \\ \vdots \\ F^{c,c} y_s[(c-1)n^p:cn^p[ \\ \vdots \\ F^{n^c,n^c} y_s[(n^c-1)n^p:n^c n^p[ \end{bmatrix}, \quad (44)$$

where $y_s[(c-1)n^p:cn^p[$ is the sub-vector of $y_s$ including the elements $(c-1)n^p$ to $cn^p - 1$. For a given realization m, the most appropriate gradient is the one providing the best reduction of the objective function for a given amplitude of perturbation. Accordingly, the method selects each $F^{c,c}$ from $\{F^{c,c}(i)\}$ so that the steepest gradient is obtained, which is equivalent to maximizing $\|F^{c,c} y_s[(c-1)n^p:cn^p[\|^2$ for each individual gridblock c. Note that other selection criteria can be applied at this step.

The computation of $n^{ap} \times n^t$ (sub)gradients $F^{c,c} y_s[(c-1)n^p:cn^p[$ demands additional computation, but stays reasonable as the dimension per gridblock (i.e., $n^p$) is very small. Moreover, this additional computation should be greatly compensated by the improvement of the convergence. Furthermore, it is possible to reduce the number of evaluation of the gradients with the iteration (e.g., using the assumption that with each iteration, the realizations m become closer to the optimum one, and therefore, it is possible to reduce the maximum of $\{I_i\}$).

Constraints, such as continuity or prior constraints, can also be soften so that the update second selection criteria based on the mismatch (value of the objective function) may also be used to select the best approximation: for a large mismatch, the algorithm favors global approximations (i.e., sensitivity matrices based on samples with large differences in values) as the current state is generally far from a global minimum. Reversely, when the mismatch is low, the current state is assumed to be close to a global minimum and local approximations (i.e., sensitivity matrices based on similar samples to the current state) are used. Finally, when the selected approximation does not lead to an improvement of the mismatch, the next best approximation is used. The algorithm can also modify the LM parameter in order to change the quadratic approximations more driven by the data.

Reducing the Number of Quadratic Approximations

Multiple Iterations Using One Quadratic Approximation

In order to reduce the number of estimations of the inverse of the Hessian $((\lambda+1)C_m^{-1} + G^T C_D^{-1} G)^{-1}$ or its equivalent expressed in the dimension of the data, it is possible to perform several iterations using the same quadratic approximation [Iglesias and Dawson (2013)], if the previous update was successful.

Multiple Use of G

It is noted that the matrices $F^{c,c}$ can be used in several gridblocks with similar $m(c)^t$. This will reduce the number of singular value decomposition to be run. However, this require to store the result of the SVD and access it when needed, which can require a large amount (actually depending on the discretization or binning of the $n^p$-Dspace) of memory or several (again depending on the binning) of read/write access to the disk.

Special Case: Petro-Physical Inversion of Fine Scale Elastic Attributes

As said before, if the input conditioned data are fine scale (i.e., vertical scale of the reservoir grid) elastic attributes, it is possible to avoid the wavelet convolution and therefore invert each gridblock of the model independently, which would reduce the computational complexity of the method.

Moreover, one quadratic approximation for one gridblock can be reused for different gridblocks (of potentially different realizations) with approximatively the same configuration (i.e., small Euclidean distance between two set of parameters).

When the resolution of the elastic attributes is coarser than the reservoir grid, instead of performing simultaneously the downscaling and the petro-physical inversion (as previously developed), it can be possible to (1) perform a consistent (with seismic response) downscaling of the elastic attribute and then (2) perform the petro-physical inversion (i.e., inversion of inversion).

Because step (1) has multiple solutions, it is proposed in this embodiment to follow a stochastic approach. For example, the method may use the seismic Bayesian inversion with the conditioning elastic attributes $d_e$ as prior model and the seismic response, $s = G_s d_e$, of these attributes as conditioning seismic in order to generate fine scale elastic realizations that are consistent with the seismic. Any downscaling method can be used. This approach allows the use of results coming from any kind of elastic inversion, which may rely on more complicated forward model (e.g., full physics inversion). Then, these "data realizations" are used to constraint the inversion of different models in order to obtain a better sampling of the posterior distribution (see RML approach [Oliver et al. (2008) Oliver, Reynolds, and Liu]).

Step (2) can be applied gridblock-by-gridblock (but still subject to the continuity constraint) very efficiently, starting from fine scale prior models. These prior realizations can incorporate different source of information/interpretations, but it is recommended to use the elastic attributes in the generating process of the prior realizations (e.g., direct interpretation+soft constraint in a geostatistical process) in order to facilitate the optimization process (prior realizations should be as close as possible to the optimum). Indeed, if the prior model is inconsistent with the conditioned data (e.g., elastic realizations), the method will either not preserve the initial model (and potentially destroy geological consistency) or obtain a poor match of the data. This is a well-known drawback of the sequential approach compared to the simultaneous approach, which is more flexible in term of data accommodation.

However, the sequential approach is more efficient because it permits to split the problem into two different sub-problems. The first one (elastic inversion) has to invert all the elements of each trace simultaneously as it involves a 1D convolution, but can be linearized such that only one iteration is required (Bayesian update). The second one can be solved independently for each gridblock (while using a continuity constraint), but is (generally) nonlinear and it is solved using iterative processes. Thus, by splitting the problem, it is possible to use the advantages of each sub-problem to efficiently solve the entire problem, whereas in the joint inversion case, it is necessary to deal with the nonlinearity in the entire process.

Trace-by-Trace (or Gridblock-by-Gridblock) Inversion: Two Different Approaches

The trace inversion being iterative in the SNLO algorithm, two different approaches are proposed herein: the Standard approach (Std-SNLO) and the Non-Standard approach (NStd-SNLO).

In the following embodiment, the inversion of (independent) traces is discussed. However, this development is also applicable to the inversion of (independent) gridblocks (e.g., see section Special case).

Standard Approach

The Std-SNLO refers to the approach where each trace is fully inverted at one time and the neighborhood used for the continuity (prior) constraint is fixed. One trace $m_k$ is fully inverted using the Levenberg-Marquardt iterative algorithm using the set of $m_p$ traces previously inverted, then this trace is used to condition inversion of the next trace $m_{k+1}$. With the Std-SNLO, the Kriging part of the prior constraint $m_{sk}$ is fixed and only computed once. However, the constraint $m_{pr,k}$ given by the prior model may evolve during the Levenberg-Marquardt iterations such that:

$$m_{sk}^l = m_{pr,k}^{l-1} + a \times \alpha^T(m_b - m_{pr,\{0,\ldots,k-1\}})$$

$$C_{sk} = C_{m\,kk} - C_{m\,bk}^T \alpha. \quad (45)$$

These equations permit to release the constraint of the prior model with iteration, but still keep the continuity constraint coming from Kriging. Note that in this case, the covariance $C_{sk}$ remains unchanged.

Non-Standard Approach

The NStd-SNLO approach refers to the process in which the entire model (all the traces) is updated at each Levenberg-Marquardt iteration. In this case, the neighborhood used for the prior constraint evolves with each iteration I. Assuming that the prior covariance matrix is fixed, the kriging weights do not need to be recomputed and $C_{sk}$ is fixed. However the Kriged value changes. The NStd-approach may be more stable as it will not suffer from error propagation (e.g., bad traces that condition the simulation of the others and cannot be corrected by the others using spatial continuity).

It may sometimes help the optimization to adapt the shape of the covariance matrix during the iterations (e.g., Covariance Matrix Adaptation Evolution Strategy (CMAES)), but this would require to recompute the Kriging weights, which is computationally demanding.

In a particular setting, where the interpolation uses a regular conditioning (i.e., the value to interpolate has a homogeneous neighborhood) and the spatial correlation is solely defined by functions based on the separating distance (e.g., variograms), the inverse distance weighting and the kriging interpolation are very similar, but in the first case, the computation of the weights is much less expensive. Then, it would be possible to adapt the local anisotropy (e.g., anisotropy could be included in the optimization or could be deduced from the current state of $m^l$). When only static spatial properties are inverted, the local modification of the correlation model may not be critical. However, this may have an impact when dynamic properties are inverted and/or the process is coupled with a dynamic inversion (e.g., (pseudo)-history-matching process).

In the case of regular conditioning, this embodiment uses at each Levenberg-Marquardt iteration I the traces of the model $m^{l-1}$ if the current update I has not been performed yet. Another advantages of using a regular conditioning is that the weights are the same for each position (with some adaptation at the edges), meaning that a different random path can be used without additional costs.

In this method, the continuity constraints can be adaptive. For example, at the first iterations, when mismatches associated with the neighbor traces (or gridblocks) are large, the constraint can be softened so that the update is mainly driven by the data. Later, when the mismatch has been reduced for the entire grid, the continuity constraint can be strengthened, as discussed later. Also, it might be appropriate to soften the continuity constraint when convergence problems occur for one trace (or gridblockl), which might be induced by a discontinuity in the spatial properties (e.g., channel, erosion in subsurface applications).

Prior Models

For seismic petro-physical inversion (i.e., $f(m, p)=f_s(m)$ $f_{pem}(m, p))$, the prior model (or realizations in the stochastic case) is given by the geologist and should integrate all the available data and knowledge. It is recalled here that the RML method defined a prior constraint based on an initial realization and not the prior mean. In theory, this realization should be a sample from a prior Gaussian distribution. However in practice, any kind of realization can be used and it is generally more interesting to use a different model as it will better sample the P-PDF.

When elastic derived attributes are used to constrain the petro-physical inversion, the prior realizations can be generated using direct interpretation techniques (e.g., density function, IRP models). The closer these realizations will be from the optimum, the faster the optimization will run. Generally, this kind of initial realizations are going to be noisy, but should be improved during the SNLO thanks to the continuity constraint (also because of the substitution in equation (45).

AEOM Method

The embodiments discussed above have focused on various aspects of a nonlinear sampling method based on a new adaptive ensemble-based optimization method for solving ill-posed problems with multiple minima (non-convex problems). The AEOM method can be used in a deterministic way (i.e., only one solution found) or in a stochastic way (i.e., sampling different minima/solutions). In the latter case, uncertainties are estimated by generating an ensemble of realizations describing the posterior probability density function (P-PDF).

The AEOM method can be applied to any optimization and sampling problems (e.g., petro-elastic inversion, geophysical inversions, risk assessment, molecular modeling, economics, engineering, etc.) as long as an ensemble of realizations of a forward model is available.

The above embodiments describe the use of an adaptive constraint while optimizing highly sensitive parameters along with less sensitive parameters. The goal of this constraint is to avoid an overtuning of the sensitive parameters and miss solutions that could be given by other configurations of less sensitive parameters. This helps improve the sampling of the uncertainty space and avoid unrealistic solutions (e.g., noisy distributions of the sensitive parameter values). This constraint can be used in any optimization process, but has been specifically designed for AEOM in order to improve the sampling of the uncertainty space.

The above embodiments also describe a sequential approach for inverting correlated parameters when the forward model can be independently evaluated (applied) using a subset of parameters at different locations. This typically can be applied to subsurface (i.e., geophysical, geological) problems where the inverted parameters are localized in space and may be spatially correlated.

Figure 5:
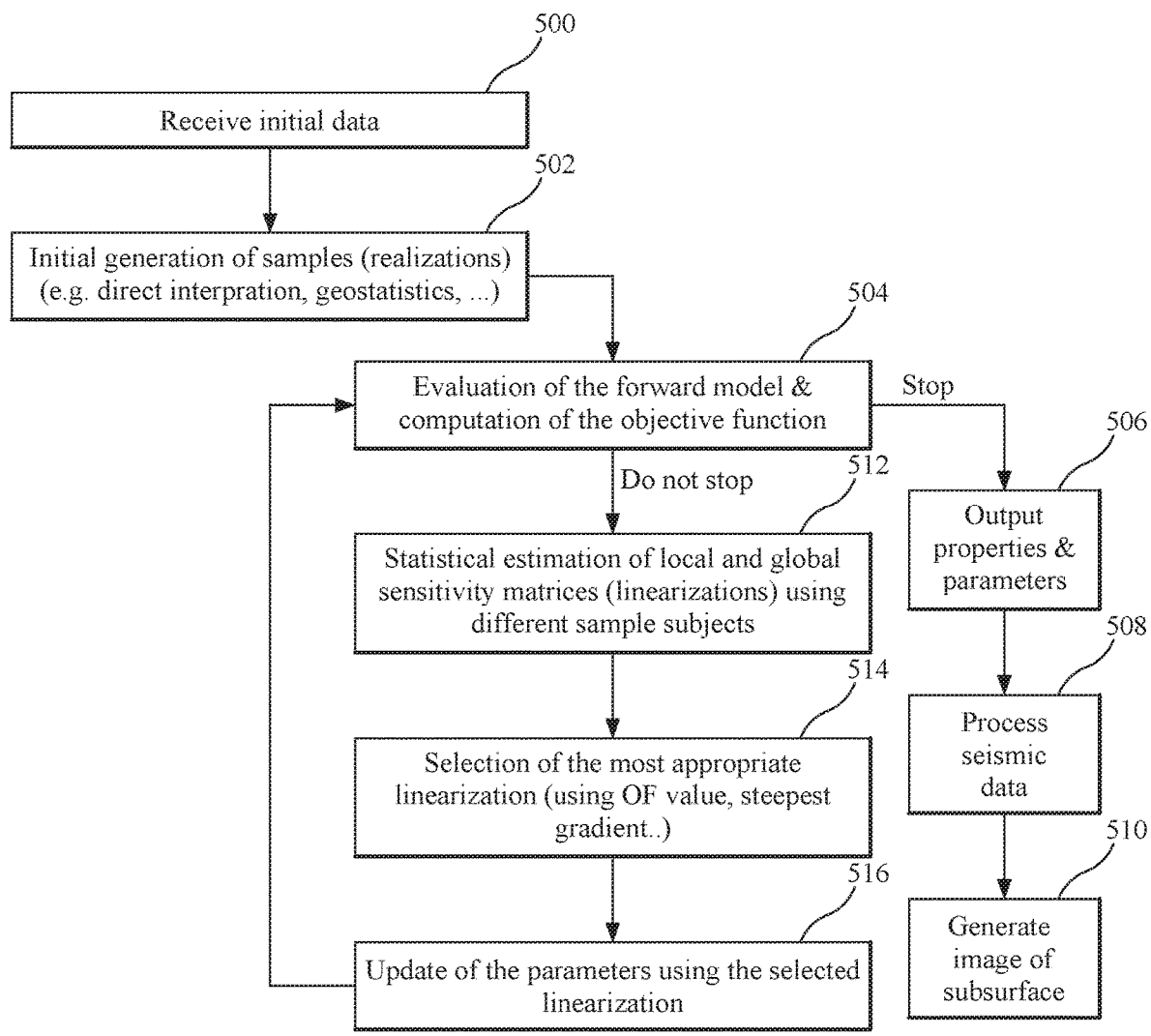
FIG. 5 is a flowchart of a method for calculating an image of a surveyed surfaces based on an adaptive ensemble-based optimization method.

According to an embodiment illustrated in FIG. 5, the AEOM method starts with step 500 in which initial data is received. The initial data may be seismic data (e.g., data collected with hydrophones, geophone, accelerometers or other seismic sensors over land, water, and/or air) and/or any data characterizing a subsurface or reservoir (e.g., elastic properties or parameters associated with a petro-physical model, like porosity, shale volume, saturation, etc.). In step 502, the initial generation of samples (e.g., realizations) takes place. One way to generate these realizations may be using a 3D or 4D deterministic inversion method. Such an inversion method starts with the seismic data from step 500 and generates through inversion the elastic parameters associated with the surveyed subsurface. An example of such elastic parameters are the impedances of the primary and secondary waves (Ip, Is), the rock velocities and density (Vp, Vs, Rho) or any derived elastic modulus (e.g., Poisson ratio, Young modulus) of the earth. Any inversion method may be used for deriving the realizations. Alternatively, the realizations may be obtained by direct interpretation, geostatics or other methods known in the art. The ensemble of realizations may include different vectors of values of parameters used as input for the forward model.

In step 504, the method runs the forward model on the input data, i.e., simulates the physical response of the earth from a model. The result of running the forward model is the simulated data. The forward model is run for the different realizations. This means that if m realizations are used, the forward model may be applied m times, once for each realization, to generate m sets of simulated data, where m is an integer. Alternately, the forward model may be applied to a subset of realizations instead of the entire set. Also in this step, the method computes the objective function, i.e., the mismatch between each realization and its corresponding simulated data calculated by the forward model. As previously discussed, the forward model may be described by equation $f(m, p) = f_s \cdot f_{pem}(m)$ (any other forward model may be considered), which is composed of one (petro-elastic model) PEM and one seismic forward model $f_s$ and the objection function O may be described by equation (7).

The method stops at step 504 if one or more convergence criteria is met, e.g., the objective function misfit is smaller than a given threshold, or a given number of iterations has been performed. The convergence criteria may be applied to a single realization and its misfit, a subset of realizations and their misfits or all the realizations. If the method determines in step 504 that at least one convergence criterion is fulfilled, the process stops and the method advances to step 506, in which the output properties and parameters of the model are generated. These properties and/or parameters are used in step 508 to further process the seismic data and in step 510 an image of the subsurface is generated based on the processed seismic data, i.e., based on data s related to the subsurface of the earth and the forward model f with updated parameters.

However, if no realization has converged in step 504, the method advances to step 512 in which the non-convergent realizations are updated using a novel adaptive approach. This novel adaptive approach involves statistical estimations of local and global sensitivity matrices (linearizations) being calculated using different sample subsets. The sensitivity matrices have been discussed in the Sensitivity Matrix section above. Local sensitivity matrices are calculated by taking into account small subsets of samples (i.e., samples that are inside given ranges of values for the inverted properties). For example, if the porosity is inverted and can take values in the range of [0, 0.4], a subset of samples may be defined as all samples with porosity values in the range of [0, 0.1] and global sensitivity matrices are calculated by taking into account larger subsets of samples (for example, a subset defined as all samples with porosity values in [0, 0.2] is "larger" than a subset defined as all samples with porosity values in the [0, 0.1] range). Then, in step 514, the method selects the most appropriate linearization or sensitivity matrix based on a given criteria, e.g., using the objective function value, steepest gradient, etc., as discussed above.

If one such criteria is the steepest gradient for all the approximations of the sensitivity matrix, when the objective function is quadratic, the gradient can be directly obtained at least cost from the sensitivity matrix. A quadratic approximation resulting in the maximum reduction of the objective function could also be used, but it requires a matrix inversion, which is computationally more expensive.

If the criterion is related to the current value of the objective function of a given model, a model with a large objective function value is generally far from a global minimum and therefore, a global approximation (using a large range of samples) is preferable in order to avoid minima. Close to a global minimum, where the objective function values are low, local approximations (i.e., using samples that are close to the current model to be updated) are preferred as problems are generally locally convex. The notion of distance between models can be quantified using the quadratic norm of the vector defined by two models (one model of dimension n being a nD point, where D is the number of inverted parameters). Other criteria can be used to select the best approximation.

In step 516, the parameters of the model are updated based on the selected linearization, i.e., the objective function is evaluated for the new parameter values and the convergence is checked. If the update does not improve the objective function (e.g., reduces its value), the update is rejected and a new update is applied using the second best (according to the criteria listed above), then the third best approximation of the sensitivity matrices and so on. All the approximations can be tested. If the objective function does not improve, the model keeps its current value (before update).

Steps 504, 512, 514 and 516 are iterated until one (or several) convergence criterion is fulfilled. At this end of the process, the updated ensemble of realizations provides an estimation of the uncertainties and can give very different solutions for the given problem.

Constraints can also be used during the update step 516. In this case, when a selected approximation does not lead to an improvement, the constraints can be slightly released. Several constraints, such a prior constraints, continuity constraints or Lagrange multipliers, can be used to condition the inversion process. A new adaptive constraint designed for highly sensitive parameters has been discussed in the Adaptive Prior Constraint section above.

The behavior of the objective function (and therefore the underlying forward model) can be quasi-discontinue around some parameter values. For example, gas saturation usually has an important impact on the elastic response in petrophysical inversion problems. When sensitive parameters (e.g., gas saturation) are inverted along with less sensitive ones (e.g., porosity), the optimization process may overtune the sensitive parameters in order to solve the problem (i.e., converge to a low objective function value). This may lead to unrealistic noisy models (e.g., noisy gas saturation) and underestimate the uncertainties as the solution space will not be correctly sampled (e.g., solutions without gas may exist but as solutions with gas are easier to reach, they are not represented). The adaptive constraints discussed above with regard to the sensitive parameters prevent these effects.

An improvement to the method discussed above with regard to FIG. 5 is now discussed.

The NStd-SNLO (NonStandard Sequential nonlinear optimization) approach discussed above refers to a method where the inversion can be decomposed into semi-independent problems (see equation (7) and associated discussion), i.e., when the forward model can be applied independently at different locations, but the inverted parameters are correlated. In this case, it is possible to sequentially solve several independent problems constrained by their local neighborhoods.

This kind of problem can be solved when inverting spatial properties. For example, continuity constraints can be used while independently inverting the parameters at different locations.

Figure 6:
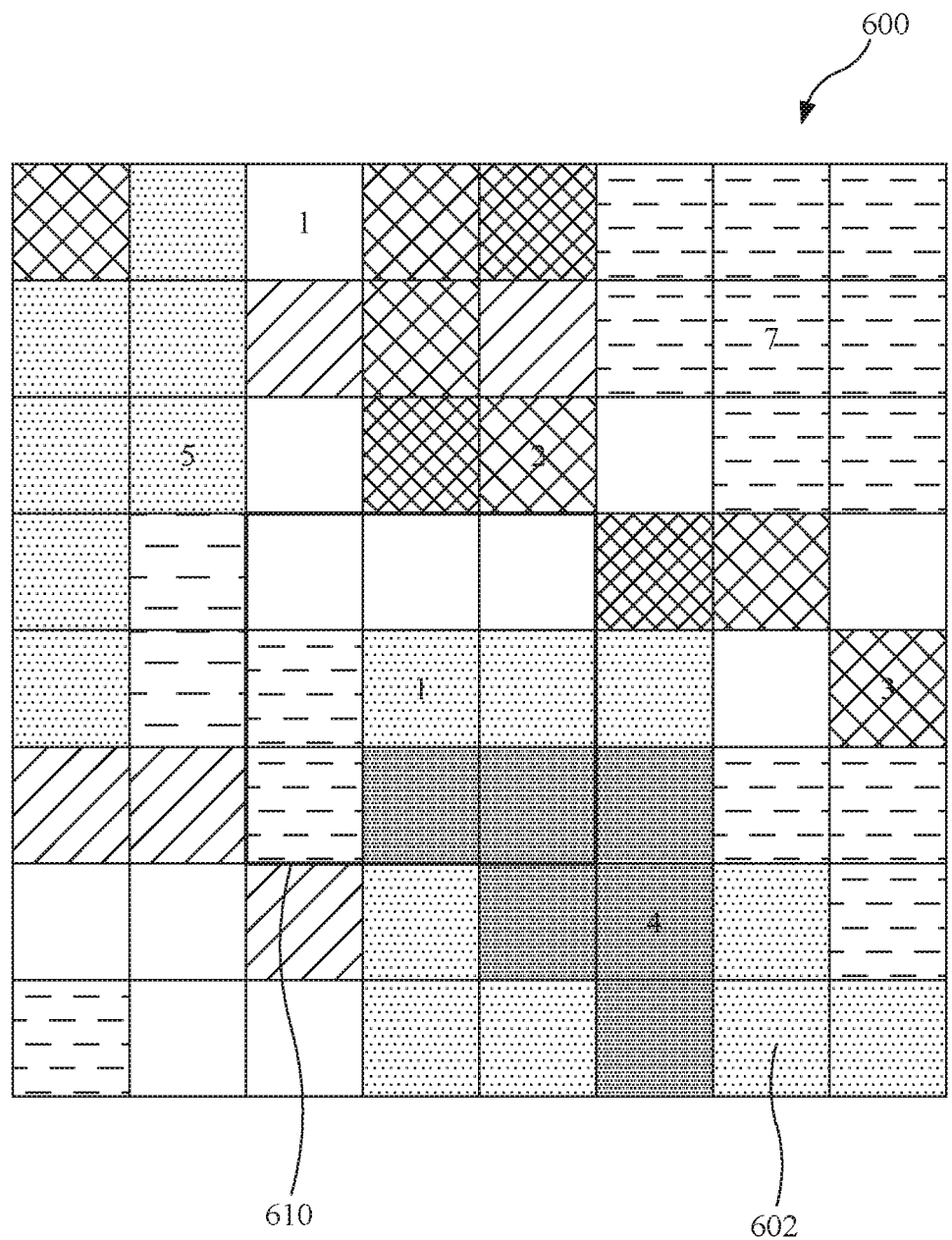
FIG. 6 illustrates a grid associated with data representing a surveyed subsurface; the domain is discretized into a grid-block, which carry values of properties for the corresponding volume of the domain.
Figure 7:
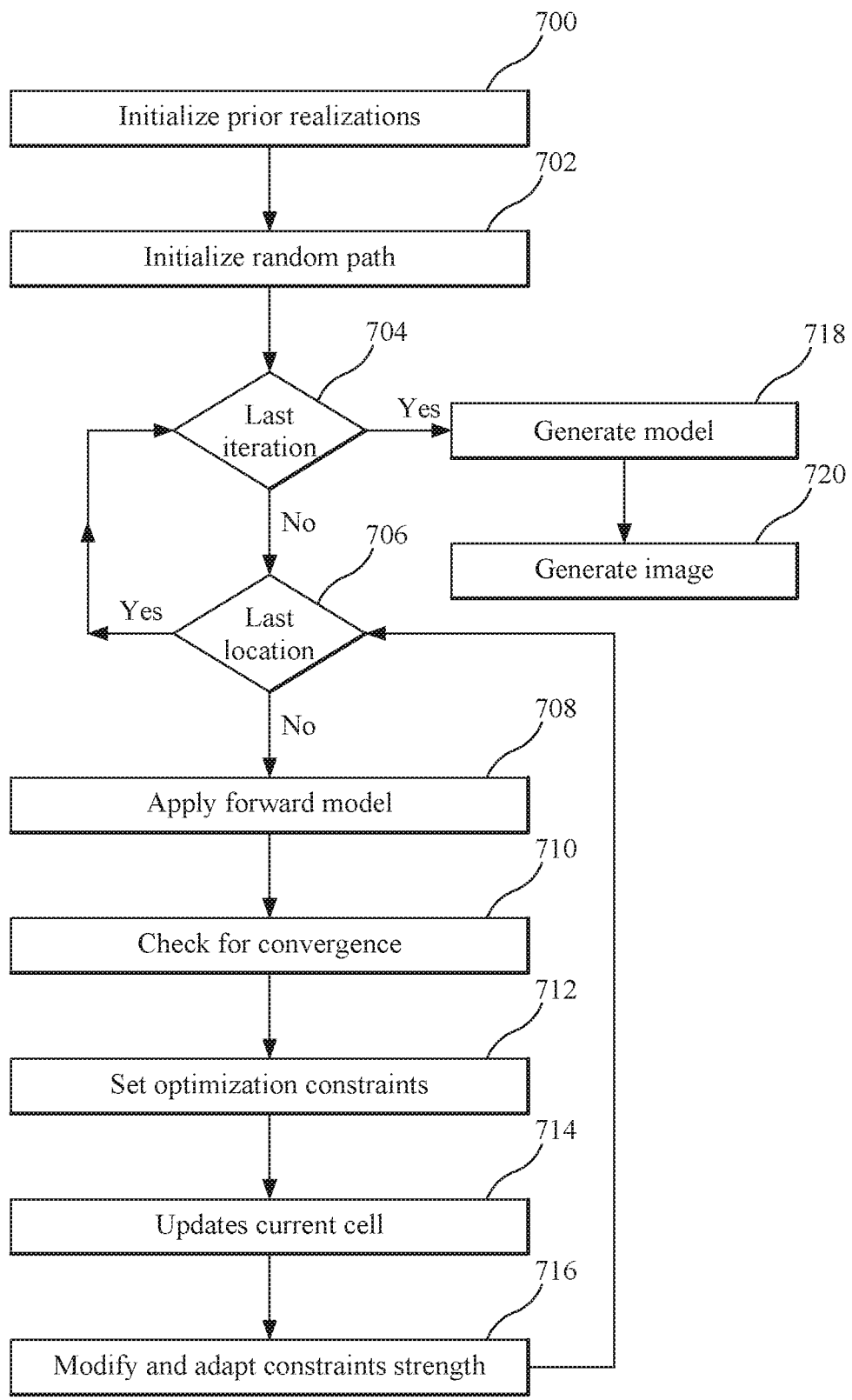
FIG. 7 is a flowchart of a method for calculating an image of a surveyed surfaces based on an adaptive ensemble-based optimization method and the grid-block.

The NStd-SNLO method is now described with regard to FIGS. 6 and 7. FIG. 6 illustrates the inversion of a spatial property discretized into a grid 600: each gridblock 602 of the grid is associated with one or several parameters and the gridblock's shade of gray represents different parameter values for a given spatial property (e.g., rock porosity).

The NStd-SNLO method starts in step 700 (in FIG. 7) with generating or receiving prior realizations of the parameters with initial values coming from prior information and knowledge before assimilation of the data. Then, in step 702, a random path 604, which follows the gridblocks 602 in grid 600 in FIG. 6 in a random order, i.e., {1, 2, 3, 4, . . . n}, is defined to visit all the gridblocks where the forward model can be applied independently. All positions are visited in one iteration and each iteration is counted in step 704. At a given position (or gridblock) of the random path, which is counted in step 706, the forward model is applied in step 708 to obtain the simulated response. In the same step, the simulated response is compared with the received data or conditioned data by using the objective function. If the match is determined in step 710 to be satisfactory (i.e., low value of the objective function) or if one convergence criteria (e.g., max number of iterations reached) is fulfilled, the parameters of the current location are not modified and the position will not be visited in the next iterations. Otherwise, the parameters will be updated in step 714 for each gridblock, depending on the mismatch and the different optimization constraints (that may depend on the position and neighborhood). For example, a continuity constraint related to spatial properties, illustrated in gridblock 1, may be defined in step 712 using the corresponding values of the neighbor gridblocks, illustrated by area 610 in FIG. 6. In this case, any kind of interpolating methods, such as Kriging, may be used to compute the constraint. Because the neighbor parameters within area 610 may not match the conditioned data yet, or have not been updated, local constraints may be inconsistent with the minimization of the mismatch. For this reason, the method adapts in step 716 the local constraints, depending on the iteration index and match of the neighborhood. Thus, at the beginning of the optimization, when the mismatch is high, the local constraints are softened and are progressively strengthened with the iterations when the mismatch is reduced.

Once the local and other constraints have been computed in step 716, the method returns to step 708, where the parameters are updated and several tries can be tested in order to improve the match with the data (i.e., reduction of the objective function). Any kind of optimization method can be used at this step (e.g., the AEOM method discussed in FIG. 5). The updated parameters in step 708 will then be used to condition the update of the next locations along the random path.

When the method arrives at the last location of the random path and the last iteration, the method generates in step 718 the parameters of the forward model and then, based on the forward model, an image of the surveyed subsurface in step 720.

Figure 8:
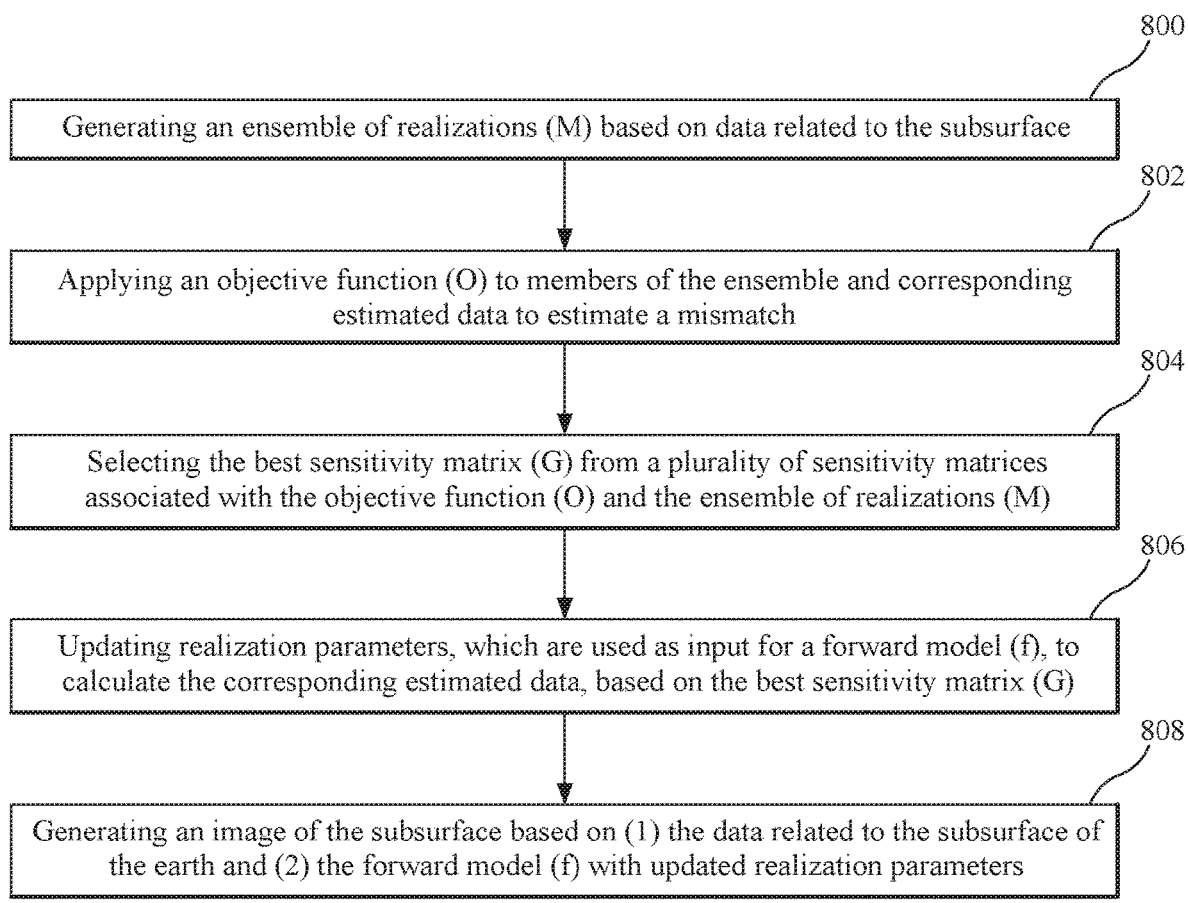
FIG. 8 is a flowchart of a method for calculating an image of a surveyed surfaces based on an adaptive ensemble-based optimization method.

According to another embodiment, a method for generating an image of a subsurface of the earth is now discussed with regard to FIG. 8. The method includes a step 800 of generating an ensemble of realizations (M) based on data related to the subsurface, a step 802 of applying an objective function (O) to members (m) of the ensemble of realizations (M) and corresponding estimated data to estimate a mismatch, a step 804 of selecting a best sensitivity matrix (G) from a plurality of sensitivity matrices associated with the objective function (O) and the ensemble of realizations (M), a step 806 of updating realization parameters ($m_{pr}$), used as input for a forward model (f) to simulate the corresponding conditioned data, based on the best sensitivity matrix (G), and a step 808 of generating an image of the subsurface based on (1) the data related to the subsurface of the earth and (2) the forward model (f) with updated realization parameters ($m_{pr}$).

Figure 9:
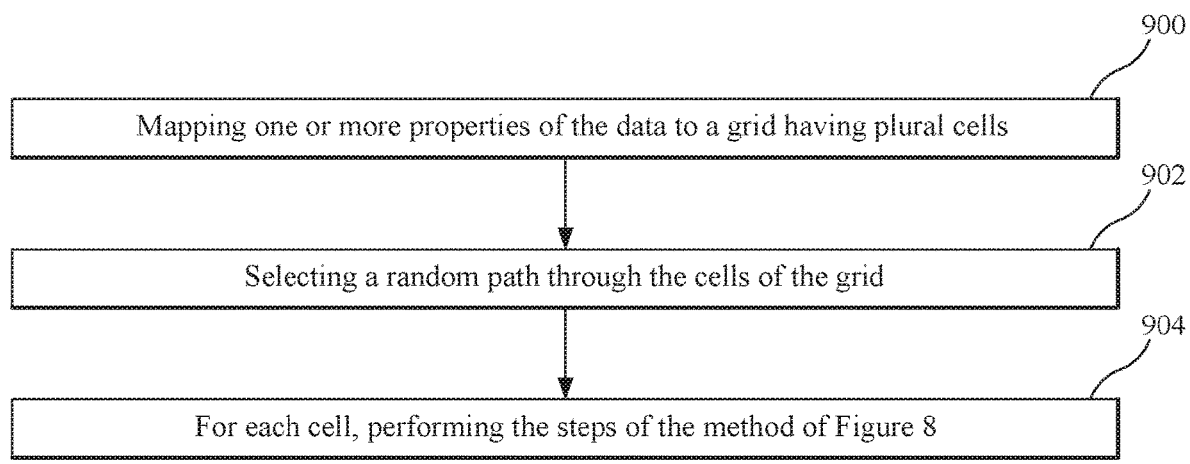
FIG. 9 is a flowchart of another method for calculating an image of a surveyed surfaces based on an adaptive ensemble-based optimization method.

According to another embodiment, there is still another method for generating an image of a subsurface of the earth. The method as illustrated in FIG. 9, includes a step 900 of mapping one or more properties of the data to a grid having plural gridblocks, a step 902 of selecting a random path through the gridblocks of the grid, and a step 904 in which, for each gridblock, the method generates an ensemble of realizations (M) based on data related to the subsurface; applies an objective function (O) to members (m) of the ensemble of realizations (M) and corresponding estimated data to estimate a mismatch; selects a best sensitivity matrix (G) from a plurality of sensitivity matrices associated with the objective function (O) and the ensemble of realizations (M); updates realization parameters ($m_{pr}$), used as input for a forward model (f) to simulate the corresponding conditioned data, based on the best sensitivity matrix (G); and generates an image of the subsurface based on (1) the data related to the subsurface of the earth and (2) the forward model (f) with updated realization parameters ($m_{pr}$).

This method may further includes calculating the plurality of sensitivity matrices based on a linearization of the forward model for different subsets of samples, wherein a sample is related to (1) one or more of the realization parameters of the forward model and (2) to a value of the one or more realization parameters being restricted to a certain range, which is smaller than a full range of possible values of the one or more realization parameters. The best sensitivity matrix is selected based on a steepest gradient method or a current value of the objective function. Different realizations for this method are updated based on different best sensitivity matrices. The step of updating may include updating the realization parameters of the forward model based on the best sensitivity matrix.

The method may also include applying an adaptive constraint during the step of updating the forward model, wherein the constraint is modified from iteration to iteration during the step of updating the forward model. In one application, the constraint is a prior constraint, a continuity constraint or a Lagrange multiplier.

The method may also include applying an adaptive constraint only to a sensitive parameter during the step of updating the forward model, wherein the sensitive parameter is defined as a parameter for which a small change translates into a large change of the forward model. In one application, the data related to the subsurface includes at least one of seismic data and elastic parameters associated with the subsurface. In another application, the objective function includes a term associated with seismic data and a term associated with a petro-elastic model of the subsurface. In still another application, the step of applying includes applying the forward model to a member of the ensemble to calculate a corresponding estimated data.

The method may also include calculating the mismatch by repeatedly calculating the objective function for each member of the ensemble and each corresponding estimated data.

The methods discussed above, especially the AEOM method, the adaptive constraint and the NStd-SNLO approach, can be used to solve a large range of linear or nonlinear, convex or non-convex inverse problems with one or several solutions. These methods can be used to update one or several models. When several models are updated, the AEOM can be used to sample the uncertainties.

Examples of application of these methods include the following, which is not intended to be a non-exhaustive list:
  Geophysical inversions (e.g., petro-elastic inversion, elastic inversion, electromagnetic inversions, gravimetry, etc.)
  Weather and climate prediction (e.g., meteorology, seasonal predictions)
  Data assimilation
  Reservoir characterization (e.g., history-matching)
  Molecular modeling
  Oceanography
  Signal processing
  Remote sensing
  Machine learning
  Optics
  Medical imaging.

The above discussed methods are implemented in a computing system, which is described later. Such a computing system is a specialized tool that includes plural processors configured to operate in parallel while performing these calculations. As the amount of data to be processed is huge, even with the specialized tool, the amount of time necessary for generating an image of the subsurface is great. The above discussed embodiments increase the speed of the specialized computer system, for example, by using an adaptive approach for calculating the sensitivity matrices, and/or applying an adaptive constraint, and/or applying the NStd-SNLO method. Further, the results of the methods discussed in FIGS. 5 and 7 improve the technological field of oil production and reservoir management. In order to increase or maintain the oil or gas output of a reservoir, the operator needs to know when to adjust the injection wells. The image or output provided by the methods noted above offer such a tool to the reservoir's operator.

Figure 10:
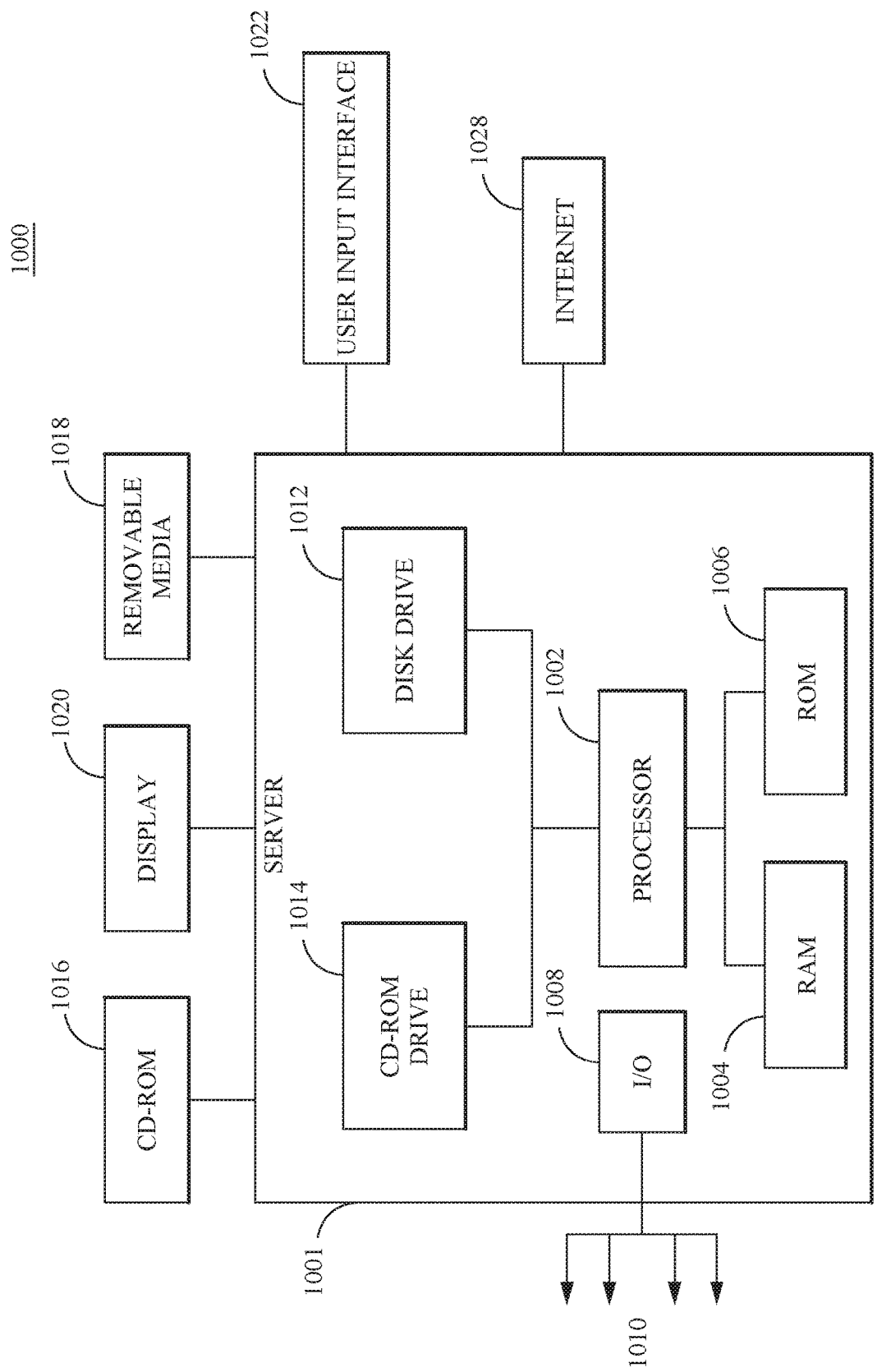
FIG. 10 is a schematic diagram of a computing system that implements one or all of the above methods.

The above methods and others may be implemented in a computing system specifically configured to calculate the image of the subsurface. An example of a representative computing system capable of carrying out operations in accordance with the exemplary embodiments is illustrated in FIG. 10. Hardware, firmware, software or a combination thereof may be used to perform the various steps and operations described herein.

The exemplary computing system 1000 suitable for performing the activities described in the exemplary embodiments may include a server 1001. Such a server 1001 may include a central processor (CPU) 1002 coupled to a random access memory (RAM) 1004 and to a read-only memory (ROM) 1006. The ROM 1006 may also be other types of storage media to store programs, such as programmable ROM (PROM), erasable PROM (EPROM), etc. The processor 1002 may communicate with other internal and external components through input/output (I/O) circuitry 1008 and bussing 1010, to provide control signals and the like. The processor 1002 carries out a variety of functions as are known in the art, as dictated by software and/or firmware instructions.

Server 1001 may also include one or more data storage devices, including a hard drive 1012, CD-ROM drives 1014, and other hardware capable of reading and/or storing information such as DVD, etc. In one embodiment, software for carrying out the above-discussed steps may be stored and distributed on a CD- or DVD-ROM 1016, removable memory device 1018 or other form of media capable of portably storing information. These storage media may be inserted into, and read by, devices such as the CD-ROM drive 1014, the disk drive 1012, etc. Server 1001 may be coupled to a display 1020, which may be any type of known display or presentation screen, such as LCD, LED displays, plasma displays, cathode ray tubes (CRT), etc. A user input interface 1022 is provided, including one or more user interface mechanisms such as a mouse, keyboard, microphone, touchpad, touch screen, voice-recognition system, etc.

Server 1001 may be coupled to other computing devices, such as landline and/or wireless terminals, via a network. The server may be part of a larger network configuration as in a global area network (GAN) such as the Internet 1028, which allows ultimate connection to various landline and/or mobile client devices. The computing device may be implemented on a vehicle that performs a land seismic survey.

Figure 11:
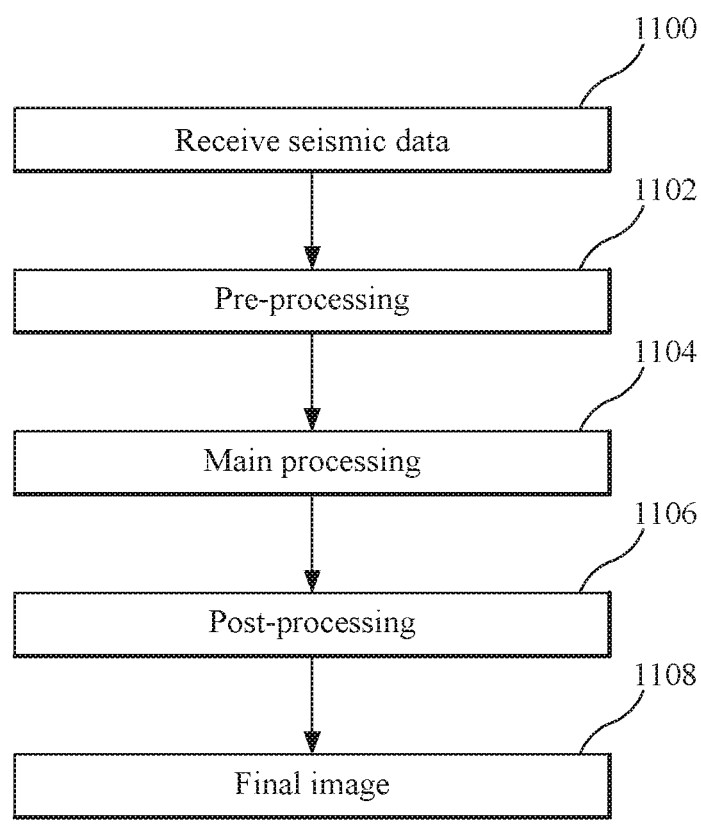
FIG. 11 is a flowchart of a method for processing seismic data for generating an image of a subsurface.

Seismic data discussed above may be processed in a corresponding processing device for generating a final image of the surveyed subsurface. For example, seismic data generated in step 508 (see FIG. 5 and associated method) may be received in step 1100 of FIG. 11 at the processing device. In step 1102 pre-processing methods are applied, e.g., demultiple, signature deconvolution, trace summing, vibroseis correlation, resampling, etc. In step 1104 the main processing takes place, e.g., deconvolution, amplitude analysis, statics determination, common middle point gathering, velocity analysis, normal move-out correction, muting, trace equalization, stacking, noise rejection, amplitude equalization, etc. In step 1106, final or post-processing methods are applied, e.g., migration, wavelet processing, inversion, etc. In step 1108 the image of the subsurface is generated.

The disclosed exemplary embodiments provide a system and a method for calculating an image of a subsurface. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

[Liberti and Maculan (2006)] L. Liberti and N. Maculan, *Global Optimization: Volume* 84, *From Theory to Implementation*. Springer, 2006, vol. 84.
[Oliver et al. (2008) Oliver, Reynolds, and Liu] D. S. Oliver, A. C. Reynolds, and N. Liu, *Inverse theory for petroleum reservoir characterization and history matching*. Cambridge University Press, 2008.
[Boyd and Vandenberghe (2004)] S. P. Boyd and L. Vandenberghe, *Convex optimization*. Cambridge university press, 2004.
[Buland and More (2003)] Buland, A. & Omre, H. Bayesian linearized AVO inversion *Geophysics, Society of Exploration Geophysicists,* 2003, 68, 185-198.
[Powell (1994)] M. J. Powell, *A direct search optimization method that models the objective and constraint functions by linear interpolation*. Springer, 1994.
[Evensen (2003)] G. Evensen, "The ensemble Kalman filter: theoretical formulation and practical implementation," *Ocean Dynamics*, vol. 53, no. 4, pp. 343-367, 2003.
[Dehdari et al. (2012), Dehdari, Oliver, et al.] V. Dehdari, D. S. Oliver, et al., "Sequential quadratic programming for solving constrained production optimization—case study from brugge field," *SPE journal*, vol. 17, no. 03, pp. 874-884, 2012.
[Golub and Van Loan (1989)] G. H. Golub and C. F. Van Loan, *Matrix Computations*, 2nd ed. Johns Hopkins University Press, Baltimore, 1989.
[Iglesias and Dawson (2013)] M. Iglesias and C. Dawson, "The regularizing levenbergmarquardt scheme for history matching of petroleum reservoirs," *Computational Geosciences*, vol. 17, no. 6, pp. 1033-1053, 2013.

What is claimed is:

1. A method for generating an image of a subsurface of the earth to represent physical reality thereof, the method comprising:
    generating an ensemble of realizations based on data acquired over the subsurface;
    generating simulated data by running a forward model for members of the ensemble of realizations and computing an objective function for each of the members using the corresponding simulated data;
    iteratively, until at least one convergence criterion is met:
        calculating a plurality of sensitivity matrices that are linearizations of the forward model for different subsets of samples,
        selecting a best sensitivity matrix for improving a mismatch between the data and the simulated data according to a given criterion, from the plurality of sensitivity matrices, and
        updating the forward model, based on the best sensitivity matrix, regenerating simulated data by running the updated forward model for the members of the ensemble of realizations and recomputing the objective function for each of the members using the corresponding updated simulated data; and
    generating an image of the subsurface based on the data related to the subsurface and the updated forward model
    wherein
    the image is useable to assess an oil and/or gas reservoir in the subsurface.

2. The method of claim 1, wherein the given criterion used to select the best sensitivity matrix is based on a steepest gradient method or a current value of the objective function.

3. The method of claim 1, wherein the at least one convergence criterion includes the objection function corresponding to a realization or to a subset of the realizations being smaller than a predetermined threshold, and/or performing a predetermined number of iterations.

4. The method of claim 1, further comprising:
    applying an adaptive constraint during the step of updating the forward model,
    wherein the constraint is modified from iteration to iteration during the step of updating the forward model.

5. The method of claim 4, wherein the constraint is a prior constraint, a continuity constraint or a Lagrange multiplier.

6. The method of claim 1, wherein the data related to the subsurface includes at least one of seismic data and elastic parameters associated with the subsurface.

7. The method of claim 1, wherein the objective function includes a term associated with seismic data and a term associated with a petro-elastic model of the subsurface.

8. The method of claim 1, wherein the step of updating comprises:
    if the recomputed objective function does not indicate a smaller misfit between the data and the simulated data, then a second best sensitivity matrix according to the given criterion is selected from the plurality of sensitivity matrices and used to update the forward model, regenerate the simulated data and recompute the objective function.

9. The method of claim 8, wherein recomputing the objective function comprises:
   calculating the objective function for each member of the ensemble and each corresponding regenerated simulated data.

10. A computing device for generating an image of a subsurface of the earth to represent a physical reality thereof, the computing device comprising:
   an input/output circuitry configured to receive data acquired over the subsurface; and
   a processor connected to the interface and configured to,
      generate an ensemble of realizations based on the data,
      generating simulated data by running a forward model for members of the ensemble of realizations and computing an objective function for each of the members to estimate a mismatch with the corresponding simulated data;
      iteratively, until at least one convergence criterion is met:
         calculate a plurality of sensitivity matrices that are linearizations of a forward model for different subsets of samples,
         select a best sensitivity matrix for improving a mismatch between the data and the simulated data according to a given criterion from the plurality of sensitivity matrices,
         update the forward model (f), based on the best sensitivity matrix, and then regenerating simulated data by running the updated forward model for the members of the ensemble of realizations and recomputing the objective function for each of the members using the corresponding updated simulated data, and
      generate an image of the subsurface based on the data related to the subsurface of the earth and the updated forward model,
   wherein
   the image is useable to assess an oil and/or gas reservoir in the subsurface.

11. The computing device of claim 10, wherein the given criterion used to select the best sensitivity matrix is based on a steepest gradient method or a current value of the objective function.

12. The computing device of claim 10, wherein the at least one convergence criterion includes the objection function corresponding to a realization or to a subset of the realizations being smaller than a predetermined threshold, and/or performing a predetermined number of iterations.

13. The computing device of claim 10, wherein the processor is further configured to:
   apply an adaptive constraint when updating the forward model,
   wherein the constraint is modified from iteration to iteration during the updating of the forward model.

14. The computing device of claim 13, wherein the constraint is a prior constraint, a continuity constraint or a Lagrange multiplier.

15. A non-transitory computer readable medium including computer executable instructions, wherein the instructions, when executed by a computer, implement a method for generating an image of a subsurface of the earth to represent physical reality thereof, the method comprising:
   generating an ensemble of realizations based on data acquired over the subsurface;
   generating simulated data by running a forward model for members of the ensemble of realizations and computing an objective function for each of the members using the corresponding simulated data;
   iteratively, until at least one convergence criterion is met:
      calculating a plurality of sensitivity matrices that are linearizations of the forward model for different subsets of samples,
      selecting a best sensitivity matrix for improving a mismatch between the data and the simulated data according to a given criterion, from the plurality of sensitivity matrices, and
      updating the forward model, based on the best sensitivity matrix, regenerating simulated data by running the updated forward model for the members of the ensemble of realizations and recomputing the objective function for each of the members using the corresponding updated simulated data; and
   generating an image of the subsurface based on the data related to the subsurface of the earth and the updated forward model,
   wherein
   the image is useable to assess an oil and/or gas reservoir in the subsurface.

16. The non-transitory computer readable medium of claim 15, wherein the given criterion used to select the best sensitivity matrix is based on a steepest gradient method or a current value of the objective function.

17. The non-transitory computer readable medium of claim 15, wherein the at least one convergence criterion includes the objection function corresponding to a realization or to a subset of the realizations being smaller than a predetermined threshold, and/or performing a predetermined number of iterations.

18. The non-transitory computer readable medium of claim 15, wherein the method further comprises:
   applying an adaptive constraint during the step of updating the forward model,
   wherein the constraint is modified from iteration to iteration during the step of updating the forward model.

19. The non-transitory computer readable medium of claim 15, wherein the data related to the subsurface includes at least one of seismic data and elastic parameters associated with the subsurface.

20. The non-transitory computer readable medium of claim 15, wherein the objective function includes a term associated with seismic data and a term associated with a petro-elastic model of the subsurface.

* * * * *